(12) United States Patent
Joe et al.

(10) Patent No.: US 6,604,039 B2
(45) Date of Patent: Aug. 5, 2003

(54) CONTROL OF TOROIDAL CONTINUOUSLY VARIABLE TRANSMISSION

(75) Inventors: Shinichiro Joe, Yokosuka (JP);
Taketoshi Kawabe, Yokohama (JP);
Itsuro Muramoto, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/197,499

(22) Filed: Jul. 18, 2002

(65) Prior Publication Data
US 2003/0069681 A1 Apr. 10, 2003

(30) Foreign Application Priority Data
Jul. 25, 2001 (JP) ........................................ 2001-224122

(51) Int. Cl.[7] ............................................... G06F 17/00
(52) U.S. Cl. .............................. 701/51; 701/53; 701/54; 701/60; 701/61; 701/65; 701/66; 701/70; 701/71; 701/72; 701/74; 701/78; 701/82; 701/83; 701/84; 475/2; 475/214; 475/215; 475/216; 475/207; 475/208; 475/218; 477/28; 477/34; 477/37; 477/40; 477/111; 477/118; 477/50; 476/2; 476/16; 713/200; 180/170; 180/197
(58) Field of Search ............................... 701/51, 52, 53, 701/54, 60, 61, 65, 66, 70, 71, 72, 74, 78, 82, 83, 84; 180/197, 170; 475/207, 208, 2, 214, 216, 215, 218; 477/37, 118, 111, 40, 50, 28, 45, 34, 46, 49; 476/2, 10; 713/200

(56) References Cited

U.S. PATENT DOCUMENTS 4,718,294 A * 1/1988 Okoshi ........................ 476/10
6,157,884 A * 12/2000 Narita et al. .................. 701/51
6,226,583 B1 * 5/2001 Iwata ........................... 701/51
6,312,357 B1 * 11/2001 Sakai et al. ................... 477/37
6,358,179 B1 * 3/2002 Sakai et al. ................. 475/216
6,383,115 B1 * 5/2002 Kawamura .................. 477/50
6,405,611 B1 * 6/2002 DeJonge et al. ............. 74/335
6,409,625 B1 * 6/2002 Sakai et al. ................. 475/208
6,436,001 B1 * 8/2002 Sakai et al. ................. 475/216
2001/0041640 A1 * 11/2001 Sakai et al. ................. 475/207
2001/0041644 A1 * 11/2001 Yasuoka et al. .............. 477/37
2002/0028722 A1 * 3/2002 Sakai et al. ................. 475/214

FOREIGN PATENT DOCUMENTS

| JP | 11-141670 | 5/1999 |
| JP | 2000-18373 | 1/2000 |

OTHER PUBLICATIONS

Setlur et al., Nonlinear control of a continuously variable transmission (CVT) of hybrid vehicle powertrains, 2001, Internet, pp. 1304–1309.*

Primary Examiner—William A. Cuchlinski, Jr.
Assistant Examiner—McDieunel Marc
(74) Attorney, Agent, or Firm—Foley & Lardner

(57) ABSTRACT

The trunnion (23) of a vehicle toroidal continuously variable transmission is displaced by a step motor (52) via a control valve (56) and oil pressure servo cylinder (50) in order to vary a speed ratio of the transmission. A controller (80) calculates a target value (z*) of a control variable (z) based on an accelerator pedal depression amount (APS) and output disk rotation speed ($\omega_{co}$) (S5). Further, a time-variant coefficient (f) showing the relation between the trunnion displacement (y) and variation rate ($\dot{\phi}$) of the gyration angle ($\phi$) of the power roller, is calculated (S10). The error between the speed change response of the transmission and a target linear characteristic can be decreased by determining a command value (u) to the step motor (52) under a control gain determined based on a time differential ($\dot{f}$) of the coefficient (f) (S20).

10 Claims, 24 Drawing Sheets

OTHER PUBLICATIONS

Guzzella et al., Feedback Linearization of spark–ignition enginies with continuously variable transmissions, 1995, IEEE, pp. 54–60.*

Deacon et al., Amodular approach to teh computer simulation of a passenger car powetrain incorporating a diesel engive and continuously variable transmission, 1994, IEEE, pp. 320–325.*

Tahbourb et al., Dynamicis analysis and control of a holonomic vehicle with a continously variable transmission, 2000, IEEE, pp. 2466–2772.*

Department of the Air Force Technical Order, Principles of Automotive Vehicles, 1956, pp. 279–285.*

* cited by examiner

US 6,604,039 B2

CONTROL OF TOROIDAL CONTINUOUSLY VARIABLE TRANSMISSION

FIELD OF THE INVENTION

This invention relates to control of a toroidal continuously variable transmission.

BACKGROUND OF THE INVENTION

Tokkai 2000-18373 published by the Japanese Patent Office in 2000 discloses a feedback control device of a toroidal continuously variable transmission (hereafter, referred to as TCVT).

This control device controls a real speed ratio to a target speed ratio using a mechanical feedback device which feeds back the displacement of a power roller to an oil pressure system that causes the power roller to displace, and a feedback controller which performs proportional/integral/differential (PID) control of the oil pressure system based on the difference between the real speed ratio and the target speed ratio.

The speed ratio of the TCVT varies according to the gyration angle of the power roller, but this relation is not linear. Thus, this control device expresses a relation between the displacement of the power roller and the speed ratio as a second differential derivative, and calculates a transfer function from the target speed ratio to the real speed ratio by the second differential derivative. By suitably setting various constants in the transfer function, stability of response of speed ratio control is obtained and overshoot is prevented.

SUMMARY OF THE INVENTION

In this control device, in calculating the transfer function from the second differential derivative, a differential of a time-variant factor representing the relation between the displacement and the gyration angular velocity of the power roller, and a differential of a first order partial differential derivative that represents the relation between the gyration angle and controlled variables, are both considered to be zero.

However, it is not correct to consider these time differentials to be zero from the viewpoint of speed change response in the speed change transient stage. For example, if it is considered that a time differential is zero when the target speed ratio varies from a small speed ratio to a large speed ratio, in the early stages of the speed ratio variation of the TCVT, the speed change response will exceed the linear characteristic defined by the transfer function, and in the latter half of the speed change variation, the speed change response is less than the linear characteristic defined by the transfer function. When the target speed ratio varies from a large speed ratio to a small speed ratio, the reverse phenomenon occurs. This error is more evident, the larger the speed change rate.

It is therefore an object of this invention to reduce the error between the speed change response of the toroidal continuously variable transmission, and the target linear characteristic.

In order to achieve the above object, this invention provides a control device of a toroidal continuously variable transmission for a vehicle. The vehicle comprises an accelerator pedal. The toroidal continuously variable transmission comprises an input disk, an output disk, a power roller which transmits torque between the input disk and the output disk, and a trunnion which supports the power roller free to rotate. The trunnion comprises a trunnion shaft and the power roller varies a gyration angle ($\phi$) according to a displacement (y) of the trunnion in the direction of the trunnion shaft to vary a speed ratio of the input disk and output disk. The transmission further comprises an oil pressure actuator which drives the trunnion in the direction of the trunnion shaft.

The control device comprises a control valve which supplies oil pressure to the oil pressure actuator, a mechanical feedback mechanism connecting the trunnion and the control valve to feed back the displacement of the trunnion to the control valve, a valve actuator which controls the control valve according to a command value (u), a sensor which detects a rotation speed ($\omega_{co}$) of the output disk, a sensor which detects a depression amount (APS) of the accelerator pedal, a sensor which detects the gyration angle ($\phi$) of the power roller, a sensor which detects the displacement (y) of the trunnion in the direction of the trunnion shaft, and a programmable controller.

The controller is programmed to calculate a target control variable ($z^*$) which is a target value of a control variable (z) being an object of control, based on the accelerator pedal depression amount (APS) and the output disk rotation speed ($\omega_{co}$), calculate a time-variant coefficient (f) representing the relation between the displacement (y) of the trunnion in the direction of the trunnion shaft and a variation rate ($\dot{\phi}$) of the gyration angle ($\phi$) of the power roller, calculate a first time differential ($\dot{f}$) which is a time differential of the time-variant coefficient (f), and determine the command value (u) by applying a control gain based on the first time differential ($\dot{f}$).

This invention also provides a control method of a toroidal continuously variable transmission for a vehicle. The vehicle comprises an accelerator pedal. The toroidal continuously variable transmission comprises an input disk, an output disk, a power roller which transmits torque between the input disk and the output disk, and a trunnion which supports the power roller free to rotate. The trunnion comprises a trunnion shaft and the power roller varies a gyration angle ($\phi$) according to a displacement (y) of the trunnion in the direction of the trunnion shaft to vary a speed ratio of the input disk and output disk. The transmission further comprises an oil pressure actuator which drives the trunnion in the direction of the trunnion shaft, a control valve which supplies oil pressure to the oil pressure actuator, a mechanical feedback mechanism connecting the trunnion and the control valve to feed back the displacement of the trunnion to the control valve, and a valve actuator which controls the control valve according to a command value (u).

The control method comprises detecting a rotation speed ($\omega_{co}$) of the output disk, detecting a depression amount (APS) of the accelerator pedal, detecting the gyration angle ($\phi$) of the power roller, detecting the displacement (y) of the trunnion in the direction of the trunnion shaft, calculating a target control variable ($z^*$) which is a target value of a control variable (z) being an object of control, based on the accelerator pedal depression amount (APS) and the output disk rotation speed ($\omega_{co}$), calculating a time-variant coefficient (f) representing the relation between the displacement (y) of the trunnion in the direction of the trunnion shaft and a variation rate ($\dot{\phi}$) of the gyration angle ($\phi$) of the power roller, calculating a first time differential ($\dot{f}$) which is a time differential of the time-variant coefficient (f), and determining the command value (u) by applying a control gain based on the first time differential ($\dot{f}$).

The details as well as other features and advantages of this invention are set forth in the remainder of the specification and are shown in the accompanying drawings.

DESCRIPTION OF THE PREFERRED EMBODIMENTS

Figure 1:
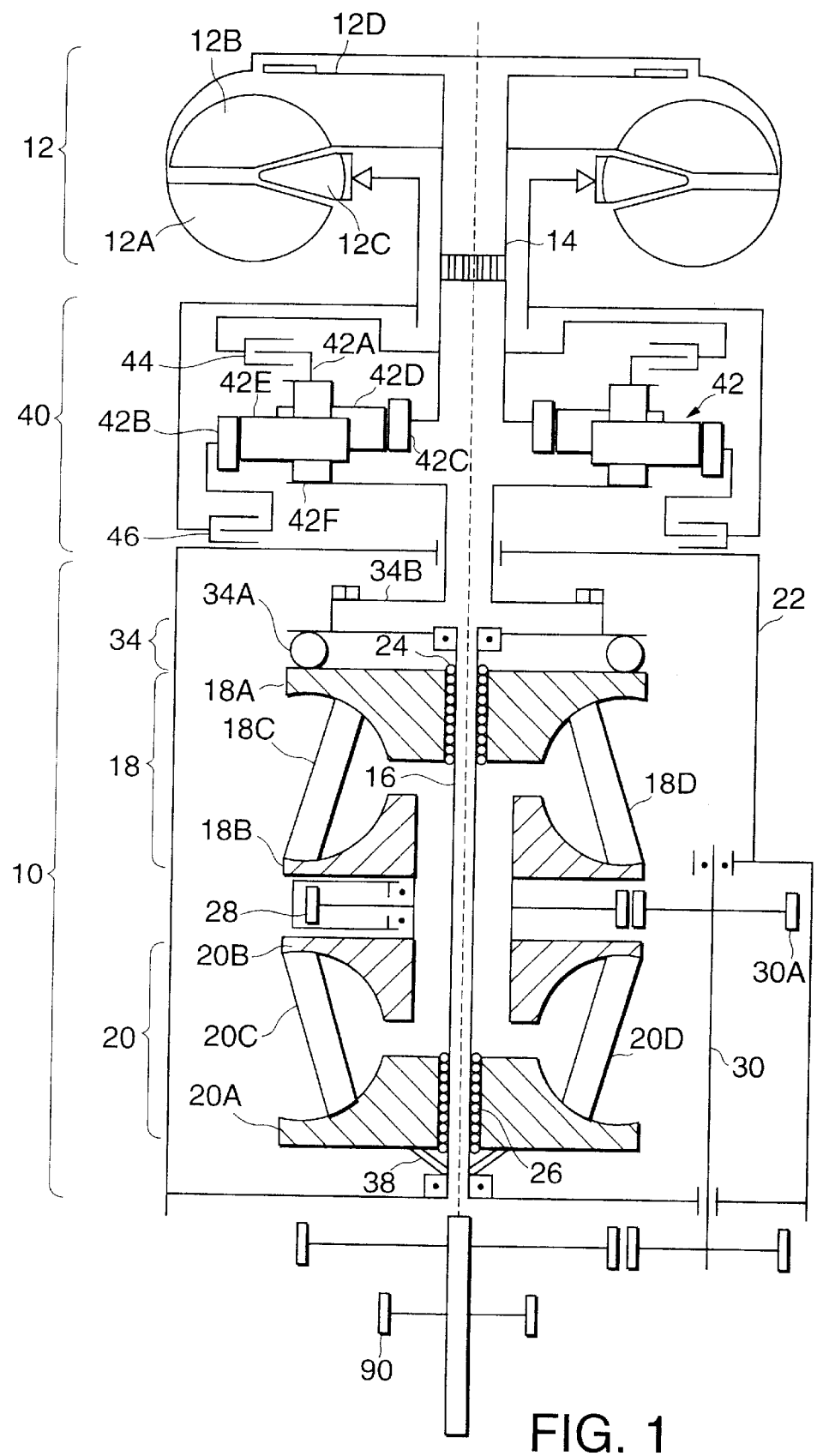
FIG. 1 is a schematic diagram of a toroidal continuously variable transmission (TCVT) to which this invention is applied.

Referring to FIG. 1 of the drawings, a toroidal continuously variable transmission (TCVT) 10 which applies this invention is connected to the engine of a vehicle via a torque converter 12. The torque converter 12 is provided with an impeller 12A, a turbine runner 12B, a stator 12C, a lock up clutch 12D, and an output rotation shaft 14.

The TCVT 10 comprises a hollow torque transmission shaft 16 disposed coaxially with the output rotation shaft 14.

The torque transmission shaft 16 is supported in a housing 22 such that it can displace to some extent in the axial direction. The TCVT 10 is provided with a first toroidal unit 18 and a second toroidal unit 20 which are formed on the torque transmission shaft 16.

The first toroidal unit 18 is provided with an input disk 18A, an output disk 18B, and a pair of power rollers 18C, 18D gripped between these disks.

The second toroidal unit 20 is provided with an input disk 20A, an output disk 20B, and a pair of power rollers 20C, 20D gripped between these disks.

The power rollers 18C, 18D transfer a rotation of the input disk 18A to the output disk 18B at an arbitrary speed ratio according to the gyration angle. The power rollers 20C, 20D transfer a rotation of the input disk 20A to the output disk 20B at an arbitrary speed ratio according to the gyration angle.

The input disk 18A is connected to the torque transmission shaft 16 via a ball spline 24, and the input disk 18B is connected to the torque transmission shaft 16 via a ball spline 26, such that some displacement is permitted in the axial direction, respectively.

The output disks 18B, 20B are formed in one piece, and are supported free to rotate relative to the torque transmission shaft 16. An output gear 28 is fixed to the output disks 18B, 20B. The rotation of the output gear 28 is transmitted to drive wheels of the vehicle via a counter gear 30A, a counter shaft 30 and other gears.

A forward/reverse change-over mechanism 40 and a loading cam mechanism 34 are disposed between the output rotation shaft 14 and torque transmission shaft 16. The forward/reverse change-over mechanism 40 is provided with a double planet planetary gear set 42, a forward clutch 44 and a reverse brake 46.

The planetary gear set 42 comprises two groups of planet gears 42D, 42E, between a sun gear 42C and a ring gear 42B. The ring gear 42B is connected with the output rotation shaft 14. The planet gears 42D are supported by a carrier 42A, and the planet gears 42E are supported by a carrier 42F.

The forward clutch 44 engages or releases the carrier 42A and output rotation shaft 14. The reverse brake 46 engages the ring gear 42B with the housing 22 and releases the ring gear 42B therefrom. The carrier 42E is connected with a drive disk 34B of the loading cam mechanism 34. The drive disk 34B is fixed to the torque transmission shaft 16.

A forward/reverse change-over mechanism 40 engages the forward clutch 44, and transmits the rotation of the engine to drive disk 34B as it is by releasing the reverse brake 46. Conversely, when the forward clutch 44 is released while engaging the reverse brake 46, the rotation of the engine is reversed and transmitted to the drive disk 34B.

The loading cam mechanism 34 comprises a cam roller 34A which is interposed between the drive disk 34A and input disk 18A. The cam roller 34A exerts an axial force on the input disk 18A according to the rotation of drive disk 34B, and makes the input disk 18A rotate together with the drive disk 34A. The cam roller 34A exerts an axial force on the input disk 18A, and also exerts a force in the reverse direction on the torque transmission shaft 16 due to the reaction. This force is transmitted to the input disk 20A via a plate spring 38. As a result, the input disk 18A is pushed towards the output disk 18B, and the input disk 20A is pushed towards the output disk 20B.

Figure 2:
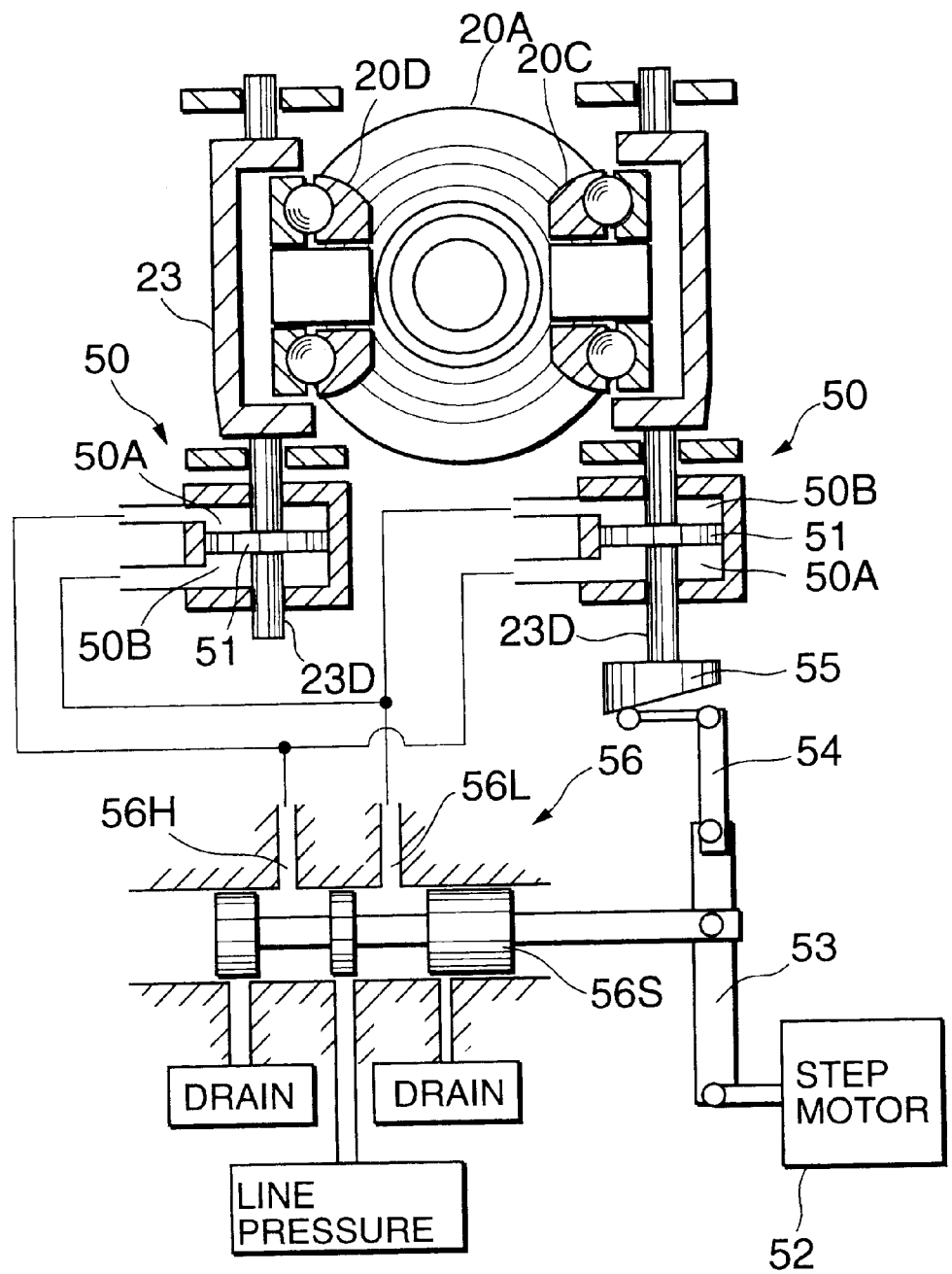
FIG. 2 is a schematic diagram of a drive mechanism of a power roller of the TCVT.

Next, referring to FIG. 2, the power rollers 20C, 20D are symmetrically disposed on both sides of the torque transmission shaft 16. The power rollers 18C, 18D are similarly disposed.

The power rollers 20C, 20D are supported by trunnions 23, respectively. A servo piston 51 of an oil pressure servo cylinder 50 is connected with the trunnion 23 via a trunnion shaft 23D. The servo piston 51 causes the trunnion 20C to displace in the direction of the trunnion shaft 23D according to the differential pressure of the oil pressures applied to the oil chambers 50A, 50B.

The oil chamber 50A is connected to a port 56H of a shift control valve 56, and an oil chamber 50B is connected to a port 56L of the shift control valve 56. The shift control valve 56 is provided with a spool 56S connected with a step motor 52 via a link 53. The shift control valve 56 supplies line pressure to one of the ports 56H, 56L and releases the pressure on the other to the drain according to the displacement of the spool 56S, thereby generating the differential pressure of the oil chambers 50A, 50B.

Of the power rollers 18C, 18D of the first toroidal unit 18 and the power rollers 20C, 20D of the second toroidal unit 20, only the trunnion 23 which supports the power roller 20C is connected to a mechanical feedback device which feeds back the axial displacement and rotational displacement of the trunnion 23 to the spool 56S. The mechanical feedback device is provided with a precess cam 55 fixed to the trunnion shaft 23D, and a link 54 which transmits the displacement of the precess cam 55 to the link 53.

The speed ratio of the TCVT 10 varies according to the gyration angle of the power rollers 18C, 18D, 20C, 20D. In order to change the gyration angle of the power rollers 18C, 18D, 20C, 20D, the trunnion 23 is driven in the direction of the trunnion shaft 23D by operation of the shift control valve 56. Consequently, the moment around the trunnion shaft 23D which the input disk 18A (20A) and output disk 18B (20B) exert on the power rollers 18C, 18D (20C, 20D) varies, and the gyration angle of the power rollers 18C, 18D (20C, 120D) varies.

Since the power rollers 18C, 18D, 20C, 20D are supported by the trunnions 23, the trunnions 23 and the trunnion shafts 23D rotate as the gyration angle of the power rollers 18C, 18D, 20C, 20D varies.

In the steady state, the power rollers 18C (20C) and 18D (20D) are located in the neutral position with respect to the displacement direction of the trunnion shaft 23. Here, the neutral position is the state wherein the centers of the rotation axis of the power rollers 18C, 18D, 20C, 20D are not offset above or below the center line of the torque transmission shaft 16. In this state, the spool 56S is maintained in the neutral position wherein the ports 56H, 56L are not connected to the line pressure PI or the drain.

If the spool 56S displaces in the axial direction due to the drive of the step motor 52, a high pressure will be supplied to either of the oil chambers 50A, 50B from the shift control valve 56, and the trunnion 23 will displace in the direction of the trunnion shaft 23D. Consequently, the gyration angle of the power roller 18C, 18D, 20C, 20D varies. The precess cam 55 feeds back this displacement to the spool 56S, and displaces the spool 56S in the reverse direction to the drive direction due to the step motor 52. Consequently, when the gyration angle of the power rollers 18C, 18D, 20C, 120D corresponding to the rotational displacement of the step motor 52 is achieved, the spool 56S returns to the neutral position. This mechanical feedback mechanism due to the precess cam 52 has a damping effect on the variation of the speed ratio of the TCVT 10 in the transient state, and suppresses fluctuation of the speed ratio.

Figure 3:
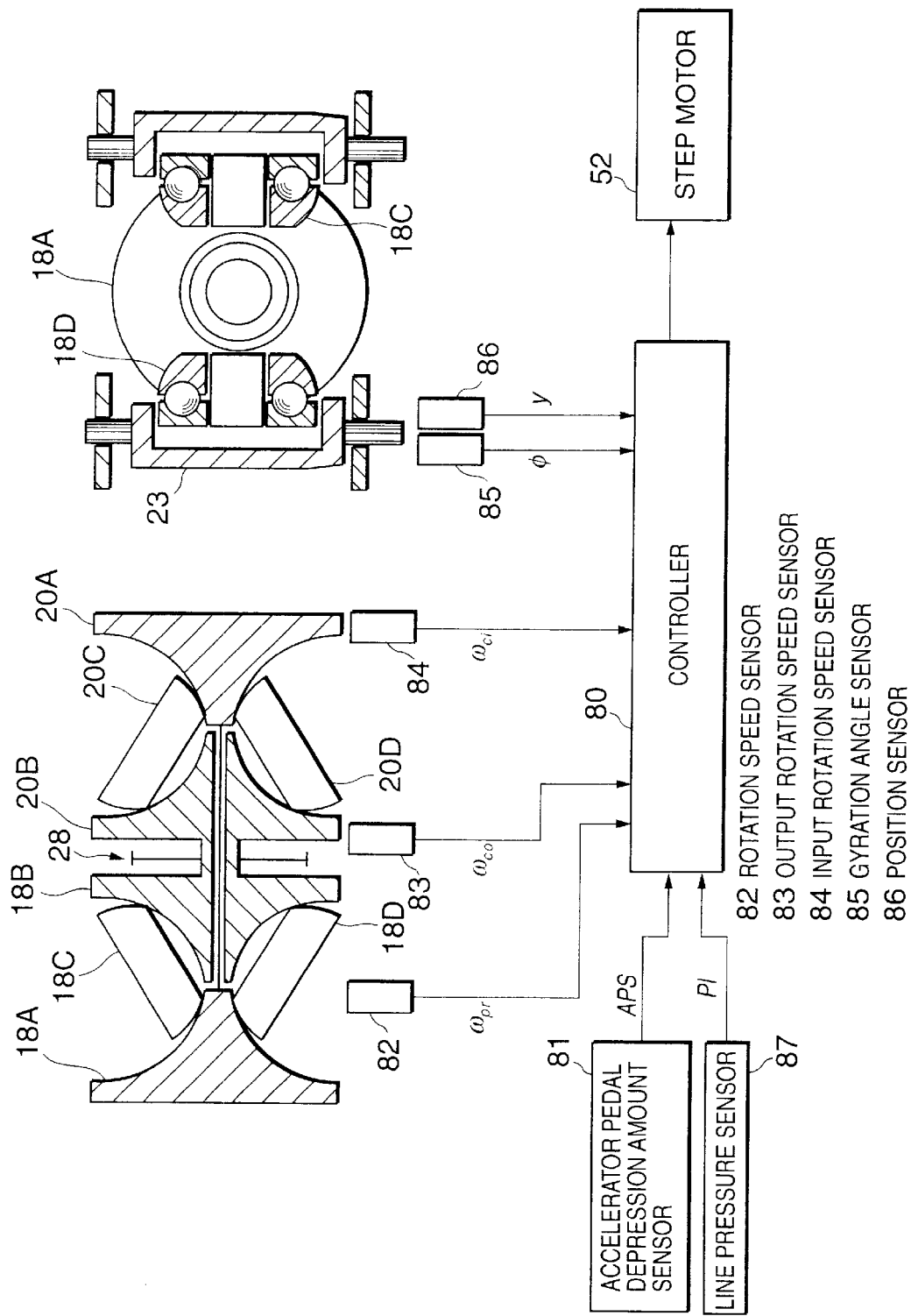
FIG. 3 is a schematic diagram of a speed ratio control device according to this invention.

Next, the construction of a speed ratio control device according to this invention provided for controlling the speed ratio of the TCVT 10 will be described, referring to FIG. 3.

Speed ratio control of the TCVT 10 is performed by a control of a step signal to a step motor 52, and the speed ratio control device is provided with a programmable controller 80 for this purpose. The controller 80 comprises a microcomputer provided with a central processing unit (CPU), read only memory (ROM), random access memory (RAM) and I/O interface (I/O interface). The controller may also comprise plural microcomputers.

In order to perform the above control, signals are input to the controller 80 from an input rotation speed sensor 84 which detects a rotation speed $\omega_{ci}$ of the input disks 18A, 20A, an output rotation speed sensor 83 which detects a rotation speed $\omega_{co}$ of the output disks 18B, 20B, a rotation speed sensor 82 which detects a rotation speed $\omega_{pr}$ of the power rollers 18C, 18D, 20C, 20D, a gyration angle sensor 85 which detects a gyration angle φ of the power rollers 18C, 18D, 20C, 20D, a position sensor 86 which detects an offset distance y from the neutral position of the trunnion 23, an accelerator pedal depression amount sensor 81 which detects a depression amount APS of an accelerator pedal with which the vehicle is provided, and a line pressure sensor 87 which detects the line pressure PI, respectively.

Next, the details of the speed ratio control performed by the controller 80 will be described, referring to FIG. 4. The blocks in this drawing show the functions of the controller 80 as imaginary units, and do not imply they physically exist.

In the TCVT 10, the dynamic characteristics of the variation of the gyration angle φ of the power rollers 18C, 18D, 20C, 20D relative to the displacement u of the step motor 52 are expressed by the following equations (1), (2) as in the above prior art. As the step motor 52 is displaced corresponding to a command value output from the controller 80, in the following description, the command value output from the controller 80 to the step motor 52, and the resulting displacement of the step motor 52, are expressed by an identical symbol u.

$$\dot{\phi}=f \cdot y \quad (1)$$

$$\dot{y}=g \cdot (u - a_1 \cdot \phi - a_2 \cdot y) \quad (2)$$

where, f=coefficient, g=valve gain for converting the position x of the spool 56S into a speed of axial displacement of the power rollers 18C, 18D, 20C, 20D, and $a_1$, $a_2$=constants depending on the specifications of the precess cam 52, and links 53, 54.

The parameters $a_1$, $a_2$, g are also dependent on the line pressure PI, so they may be computed using a map obtained beforehand by a system identification test etc., and are previously stored in the memory of the controller 80 as constants.

A speed ratio G has the nonlinear characteristic shown in the following equation (3) relative to the gyration angle φ.

$$G = h(\phi) = \frac{c_{g0} - \cos(2 \cdot c_{g1} - \phi)}{C_{g0} - \cos\phi} \quad (3)$$

where, $C_{g0}$, $C_{g1}$ = constants depending on the construction of the TCVT 10.

A coefficient f is expressed by the following equation (4) depending on the gyration angle $\phi$ of the power rollers 18C, 18D, 20C, 20D, and the rotation speed $\omega_{co}$ of the output disks 18B, 20B.

$$f(\phi, \omega_{co}) = \frac{\cos(c_{g1} - \phi) \cdot \{c_{g0} - \cos(2 \cdot c_{g1} - \phi)\}}{cf} \cdot \omega_{co} \quad (4)$$

where, cf=constant depending on the construction of the TCVT 10.

Figure 4:
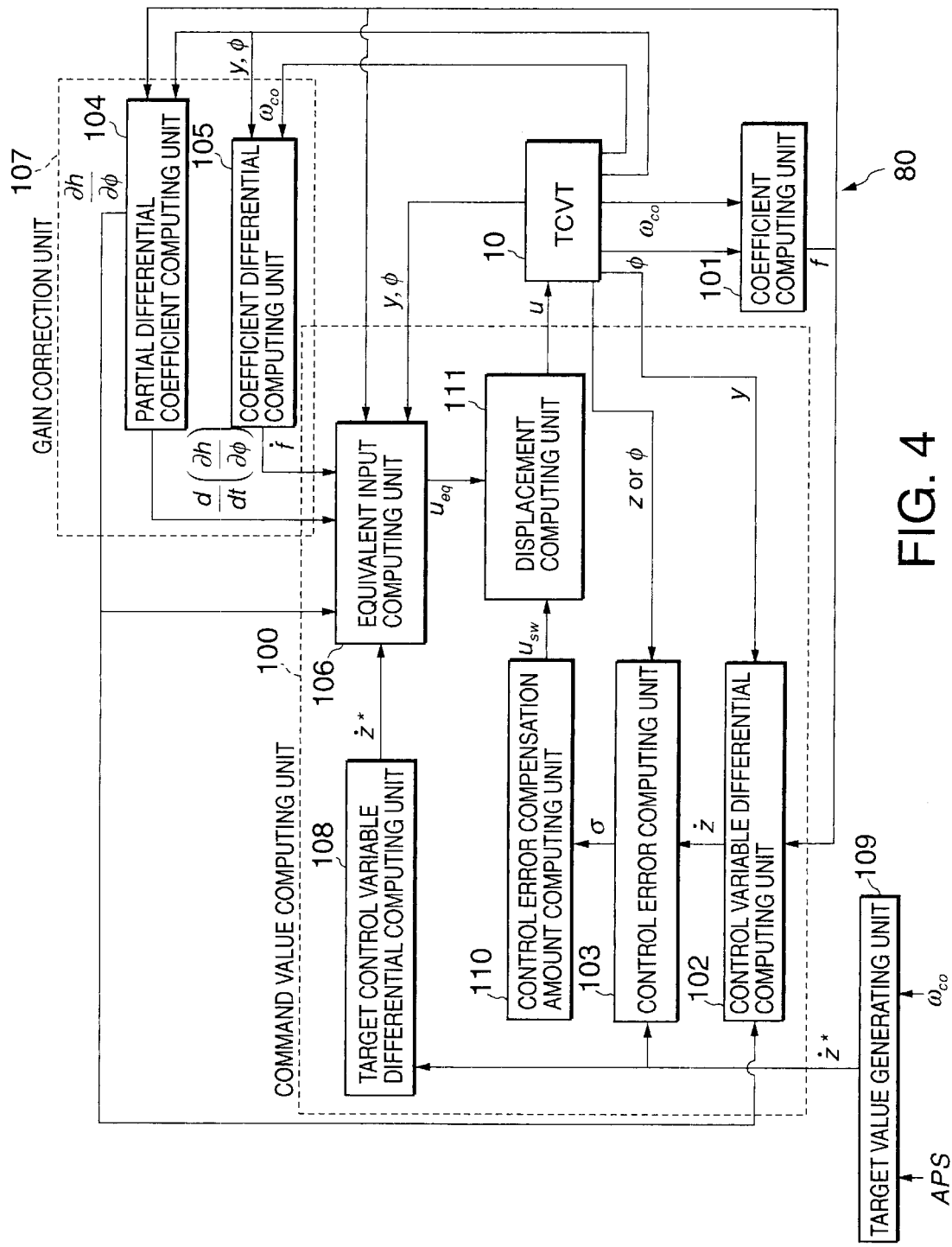
FIG. 4 is a block diagram describing the function of a programmable controller according to this invention.

Referring to FIG. 4, in order to determine the command value u output to the step motor 52, the controller 80 comprises a coefficient computing unit 101, a control variable differential computing unit 102, a control error computing unit 103, a partial differential derivative computing unit 104, a coefficient differential computing unit 105, an equivalent input computing unit 106, a target control variable differential computing unit 108, a control error compensation amount computing unit 110, a displacement computing unit 111 and a target value generating unit 109. The partial differential derivative computing unit 104 and coefficient differential computing unit 105 form a gain correction unit 107.

The control variable differential computing unit 102, control error computing unit 103, equivalent input computing unit 106, target control variable differential computing unit 108, control error compensation amount computing unit 110 and displacement computing unit 111 form a command value computing unit 100.

The coefficient computing unit 101 computes the coefficient f using the equation (4) from the gyration angle $\phi$ and rotation speed $\omega_{co}$ of the output disks 18B, 20B. The coefficient f is determined by the geometry of the toroidal units, and is a time-variant constant expressing the relation between the axial displacement and the gyration angular velocity of the power roller.

The gyration angle $\phi$ is detected by a gyration angle sensor 85. The gyration angle $\phi$ can also be estimated by an observer, or calculated by looking up a map shown in FIG. 5 prestored in the controller 80 from the speed ratio G calculated by the following equation (5).

$$G = \frac{\omega_{ci}}{\omega_{co}} \quad (5)$$

The partial differential derivative computing unit 104 calculates a partial differential derivative $$\frac{\partial h}{\partial \phi}$$

and its time differential $$\frac{d}{dt}\left(\frac{\partial h}{\partial \phi}\right).$$

Here, considering the control variable z to be the speed ratio G of the TCVT 10, the equation (3) is expressed by the following equation (6).

$$z = h(\phi) = \frac{c_{g0} - \cos(2 \cdot c_{g1} - \phi)}{c_{g0} - \cos\phi} \quad (6)$$

The partial differential derivative $$\frac{\partial h}{\partial \phi}$$

is expressed by the following equation (7).

$$\frac{\partial h}{\partial \phi} = \frac{\sin(2 \cdot c_{g1} - \phi)}{c_{g0} - \cos\phi} - \frac{\sin\phi \cdot \{c_{g1} - \cos(2 \cdot c_{g1} - \phi)\}}{(c_{g0} - \cos\phi)^2} \quad (7)$$

The partial differential derivative computing unit 104 directly calculates the partial differential derivative $$\frac{\partial h}{\partial \phi}$$

using the equation (7), or calculates the partial differential derivative $$\frac{\partial h}{\partial \phi}$$

from the gyration angle $\phi$ by looking up a map based on the equation (7) that is previously stored in the memory of the controller 80.

The time differential $$\frac{d}{dt}\left(\frac{\partial h}{\partial \phi}\right)$$

is given by the following equation (8).

$$\frac{d}{dt}\left(\frac{\partial h}{\partial \phi}\right) = \frac{\partial^2 h}{\partial \phi^2} \cdot \dot{\phi} \quad (8)$$

Equation (9) is obtained from the equations (1) and (8).

$$\frac{d}{dt}\left(\frac{\partial h}{\partial \phi}\right) = \frac{\partial^2 h}{\partial \phi^2} \cdot f \cdot y \quad (9)$$

$$\frac{\partial h}{\partial \phi}$$

in the equation (9) can be calculated by the following equation (10) by differentiating $$\frac{\partial^2 h}{\partial \phi^2}$$

of the equation (7) with respect to the gyration angle ϕ.

$$\frac{\partial^2 h}{\partial \phi^2} = \frac{\cos(2 \cdot c_{g1} - \phi)}{c_{g0} - \cos\phi} - \frac{\sin\phi \cdot \sin(2 \cdot c_{g1} - \phi)}{(c_{g0} - \cos\phi)^2} - \qquad (10)$$
$$\frac{\cos\phi \cdot \{c_{g0} - \cos(2 \cdot c_{g1} - \phi)\}}{(c_{g0} - \cos\phi)^2} +$$
$$\frac{\sin\phi \cdot \sin(2 \cdot c_{g1} - \phi) \cdot \{c_{g0} - \cos(2 \cdot c_{g1} - \phi)\}}{(c_{g0} - \cos c_{g0} - \cos\phi^2)} +$$
$$\frac{2 \cdot \sin^2\phi \cdot \{C_{g0} - \cos(2 \cdot c_{g0} - \phi)\}}{(c_{g0} - \cos\phi)^3}$$

The partial differential derivative computing unit 104 directly calculates the time differential $$\frac{d}{dt}\left(\frac{\partial h}{\partial \phi}\right)$$

from the gyration angle ϕ by the equations (9) and (10). Alternatively, a map generated based on the equations (9) and (10) is previously stored in the memory of the controller 80 and the partial differential coefficient computing unit 104 may obtain the time differential $$\frac{d}{dt}\left(\frac{\partial h}{\partial \phi}\right)$$

by looking up the map according to the gyration angle ϕ.

The coefficient differential computing unit 105 calculates the coefficient f and the time differential of the coefficient ḟ, from the gyration angle ϕ of the power roller, offset distance y of the trunnion 23 form the neutral position, and rotation speed $\omega_{co}$ of the output disks 18B, 20B. The time differential ḟ of the coefficient f is given by the following equation (11).

$$\dot{f} = \frac{\partial f}{\partial \phi} \cdot \dot{\phi} + \frac{\partial f}{\partial \omega_{co}} \cdot \dot{\omega}_{co} \qquad (11)$$

If the relation of the equation (1) is applied to the equation (11), the following equation (12) will be obtained.

$$\dot{f} = \frac{\partial f}{\partial \phi} \cdot f \cdot y + \frac{\partial f}{\partial \omega_{co}} \cdot \dot{\omega}_{co} \qquad (12)$$

$$\frac{\partial f}{\partial \phi}$$

in the equation (12) is given by the following equation (13) deduced from the equation (4).

$$\frac{\partial f}{\partial \phi} = \frac{\sin(c_{g1} - \phi) \cdot \{c_{g1} - \cos(2 \cdot c_{g1} - \phi)\} - \frac{\sin(2 \cdot c_{g1} - \phi) \cdot \cos(c_{g1} - \phi)}{c_f}}{c_f} \cdot \omega_{co} \qquad (13)$$

where, cf, $c_{g1}$=constants depending on the construction of the TCVT 10.

The coefficient differential computing unit 105 calculates $$\frac{\partial f}{\partial \phi}$$

using the equation (13) from the gyration angle ϕ and rotation speed $\omega_{co}$ of the output disks 18B, 20B or by looking up a map previously prepared based on the equation (13).

On the other hand, $$\frac{\partial f}{\partial \omega_{co}}$$

in the equation (12) is expressed by the following equation (14) deduced from equation (4), $$\frac{\partial f}{\partial \omega_{co}} = \frac{\cos(c_{g1} - \phi) \cdot \{c_{g0} - \cos(2 \cdot c_{g1} - \phi)\}}{c_f} \qquad (14)$$

where, $C_{g0}$=constant depending on the configuration of the TCVT 10.

The coefficient differential computing unit 105 directly calculate $$\frac{\partial f}{\partial \omega_{co}}$$

based on equation (14), or calculates $$\frac{\partial f}{\partial \omega_{co}}$$

from the gyration angle ϕ by looking up a map that is previously prepared based on equation (14).

The time differential $\dot{\omega}_{co}$ of the rotation speed $\omega_{co}$ of the output disks 18B, 20B in the equation (12) is calculated from the variation of the rotation speed $\omega_{co}$ for every computation period, or is calculated using a pseudo-differentiator. The output disks 18B, 20B are influenced by the inertial force of the vehicle, so the time variation is small. Therefore, the differential $\dot{\omega}_{co}$ of the rotation speed $\omega_{co}$ of the output disks 18B, 20B is also small compared for example with the variation of the gyration angle ϕ. According to experiments or simulations by the inventors, there is no problem in practice even if the time differential $\dot{\omega}_{co}$ is regarded as zero.

The control variable differential computing unit 102 calculates a differential ż of the control variable z from the offset distance y of the trunnion 23 from the neutral position, the coefficient f and the partial differential derivative $$\frac{\partial h}{\partial \phi}.$$

The control variable z is a function of the gyration angle ϕ, so the differential ż of the control variable z is given by the following equation (15).

$$\dot{z} = \frac{\partial h}{\partial \phi} \cdot \dot{\phi} \qquad (15)$$

The following equation (16) is obtained from the equations (15) and (1).

$$\dot{z} = \frac{\partial h}{\partial \phi} \cdot f \cdot y \quad (16)$$

The control variable differential computing unit 102 calculates the differential $\dot{z}$ of the control variable z from equation (16).

The target value generating unit 109 calculates a target control variable z* from the accelerator pedal depression amount APS detected by the accelerator pedal depression amount sensor 81, and the rotation speed $\omega_{co}$ of the output disks 18B, 20B detected by the rotation speed sensor 83, by the following process.

First, the vehicle speed VSP is calculated by multiplying the rotation speed $\omega_{co}$ by a constant kv, by equation (17). The constant kv is a constant depending on the gear ratio of a final gear interposed between the TCVT 10 and the drive wheels of the vehicle, and the tire diameter.

$$VSP = kv \cdot \omega_{co} \quad (17)$$

Figure 6:
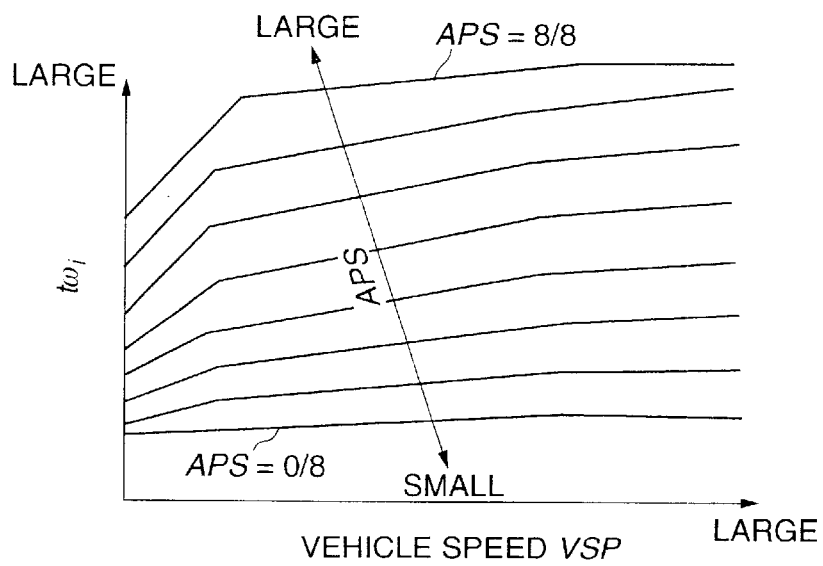
FIG. 6 is a diagram showing the characteristics of a map stored by the controller, specifying the relation between a vehicle speed VSP, a final input rotation speed $t\omega_i$ and an accelerator pedal depression amount APS.

Next, the final input rotation speed t$\omega_i$ is calculated from the accelerator pedal depression amount APS and vehicle speed VSP using a map having the characteristics shown in FIG. 6.

Next, a final control variable tz is calculated by the following equation (18) from the final input rotation speed t$\omega_i$ and rotation speed $\omega_{co}$ of the output disks 18B, 20B.

$$tz = \frac{t\omega_i}{\omega_{co}} \quad (18)$$

Finally, the final control variable tz is processed by a lowpass filter to calculate the target control variable z*. The lowpass filter is represented by the following equation (19).

$$\dot{z}^* = -c_f \cdot z^* + c_f \cdot tz \quad (19)$$

where, $c_f$=cutoff frequency of lowpass filter.

The target control variable differential computing unit 108 computes the differential line pressure $\dot{z}^*$ of the target control variable z*.

The control error computing unit 103 calculates a control error $\sigma$ from the control variable z, control variable differential $\dot{z}$ and target control variable z*.

These relations are expressed by the following equation (20).

$$\sigma = \dot{z} + c_0 \cdot (z - z^*) \quad (20)$$

where, $c_0$=first order delay time constant.

The control variable z is calculated as the speed ratio G of the TCVT 10 using equation (6) from the gyration angle $\phi$ of the power rollers 18C, 18D, 20C, 20D detected by the gyration angle sensor 85. Alternatively, it is calculated using equation (5) from the rotation speed $\omega_{co}$ of the output disks 18B, 20B and the rotation speed $\omega_{ci}$ of the input disks 18A, 20A detected by the input rotation speed sensor 84.

The relation between the control variable z, control variable differential $\dot{z}$ and target control variable z* when the control error $\sigma$ is zero is expressed by the following equation (21).

$$\dot{z} = -c_0 \cdot z + c_0 \cdot z^* \quad (21)$$

The equation (21) shows that the control variable z has a first order delay relative to the target control variable z* when the control error $\sigma$ is zero.

The control error compensation amount computing unit 110 calculates a control error compensation amount $u_{sw}$ using the following equation (22) from the control error $\sigma$.

$$u_{sw} = -k \cdot \frac{\sigma}{|\sigma|} \quad (22)$$

where, k=switching gain.

If the switching gain k is set large, the control error $\sigma$ will converge to zero in a finite time. The target control variable differential computing unit 108 calculates the target control variable differential $\dot{z}^*$ from the target control variable z*. This calculation is performed by processing the target control variable z* by a pseudo-differentiator, or by using the equation (19).

The equivalent input computing unit 106 calculates an equivalent input $u_{eq}$ equivalent to the command signal to the step motor 52 when the control error $\sigma$ is a fixed value, from the gyration angle $\phi$ of the power rollers 18C, 18D, 20C, 20D, the offset distance y of the trunnion 23 from the neutral position, the target control variable differential $\dot{z}^*$ and the coefficient f.

Therefore, both sides of the equation (20) are differentiated to obtain the following equation (23).

$$\dot{\sigma} = \ddot{z} + c_0 \cdot \dot{z} - c_0 \cdot \dot{z}^* \quad (23)$$

When the control error $\sigma$ is fixed, the control error differential $\dot{\sigma}$ is zero. Therefore, equation (23) is replaced by the following equation (24).

$$\ddot{z} = -c_0 \cdot \dot{z} + c_0 \cdot \dot{z}^* \quad (24)$$

On the other hand, if both sides of the equation (16) are differentiated, the following equation (25) is obtained.

$$\ddot{z} = \frac{d}{dt}\left(\frac{\partial h}{\partial \phi}\right) \cdot f \cdot y + \frac{\partial h}{\partial \phi} \cdot \dot{f} \cdot y + \frac{\partial h}{\partial \phi} \cdot f \cdot \dot{y} \quad (25)$$

If the equation (2), equation (16), equation (24) and equation (25) are solved for the command value u of the step motor 52, the following equation (26) is obtained.

$$u = \left\{ a_2 - \frac{\frac{d}{dt}\left(\frac{\partial h}{\partial \phi}\right)}{\frac{\partial h}{\partial \phi} \cdot g} - \frac{\dot{f}}{f \cdot g} \right\} \cdot y - \frac{c_0}{\frac{\partial h}{\partial \phi} \cdot f \cdot g} \cdot (\dot{z} - \dot{z}^*) + a_1 \cdot \phi \quad (26)$$

The equivalent input computing unit 106 calculates the command value u of the step motor 52 using the differential $\dot{f}$ of the coefficient f and the time differential $$\frac{d}{dt}\left(\frac{\partial h}{\partial \phi}\right)$$

of the partial differential derivative $$\frac{\partial h}{\partial \phi}$$

which were considered to be zero in the above mentioned prior art example by equation (26), and this is input into the displacement computing unit 111 as the equivalent input $u_{eq}$. For the purpose of the calculation of equation (26), the partial differential derivative computing unit 104 of the gain correction unit 107 calculates the time differential $$\frac{d}{dt}\left(\frac{\partial h}{\partial \phi}\right),$$

and the coefficient differential computing unit 105 of the gain correction unit 107 calculates the differential f.

As long as there is no external disturbance and there is no parameter error, the equivalent input $u_{eq}$ calculated in the equation (26) makes the control error differential $\dot{\sigma}$ zero. In other words, if we make the control error $\sigma$ in the initial state zero, the control error remains zero due to the equivalent input $u_{eq}$. Therefore, the relation between the control variable z and target control variable z* is given by the equation (24).

The displacement computing unit 111 outputs the sum of the control error compensation amount $u_{sw}$ calculated by the control·error compensation amount computing unit 110 and the equivalent input $u_{eq}$ calculated by the equivalent input computing unit 106, to the step motor 52 of the TCVT 10 as a step motor displacement command value u.

When there is an external disturbance or a parameter error, the control error $\sigma$ does not become zero with the equivalent input $u_{eq}$ alone. The control error $\sigma$ is maintained at zero by using the control error compensation amount $u_{sw}$ of a magnitude sufficient for compensating the disturbance and parameter error. As long as the control error a is maintained at zero, the control variable z and target control variable z* maintain the relation of the equation (21). That is, the dynamic characteristics of the control variable z relative to the target control variable z* are linear characteristics shown by the equation (21).

Figure 7A:
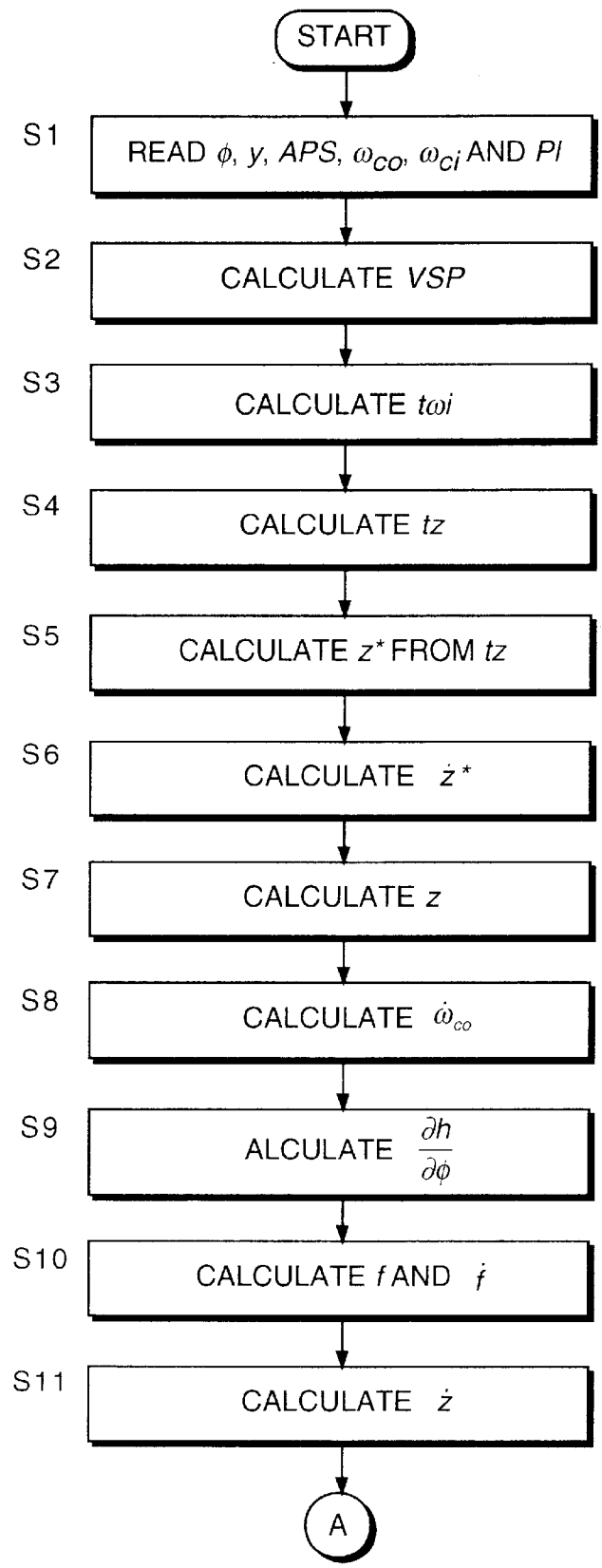
FIGS. 7A and 7B are flowcharts describing a speed ratio control routine performed by the controller.
Figure 7B:
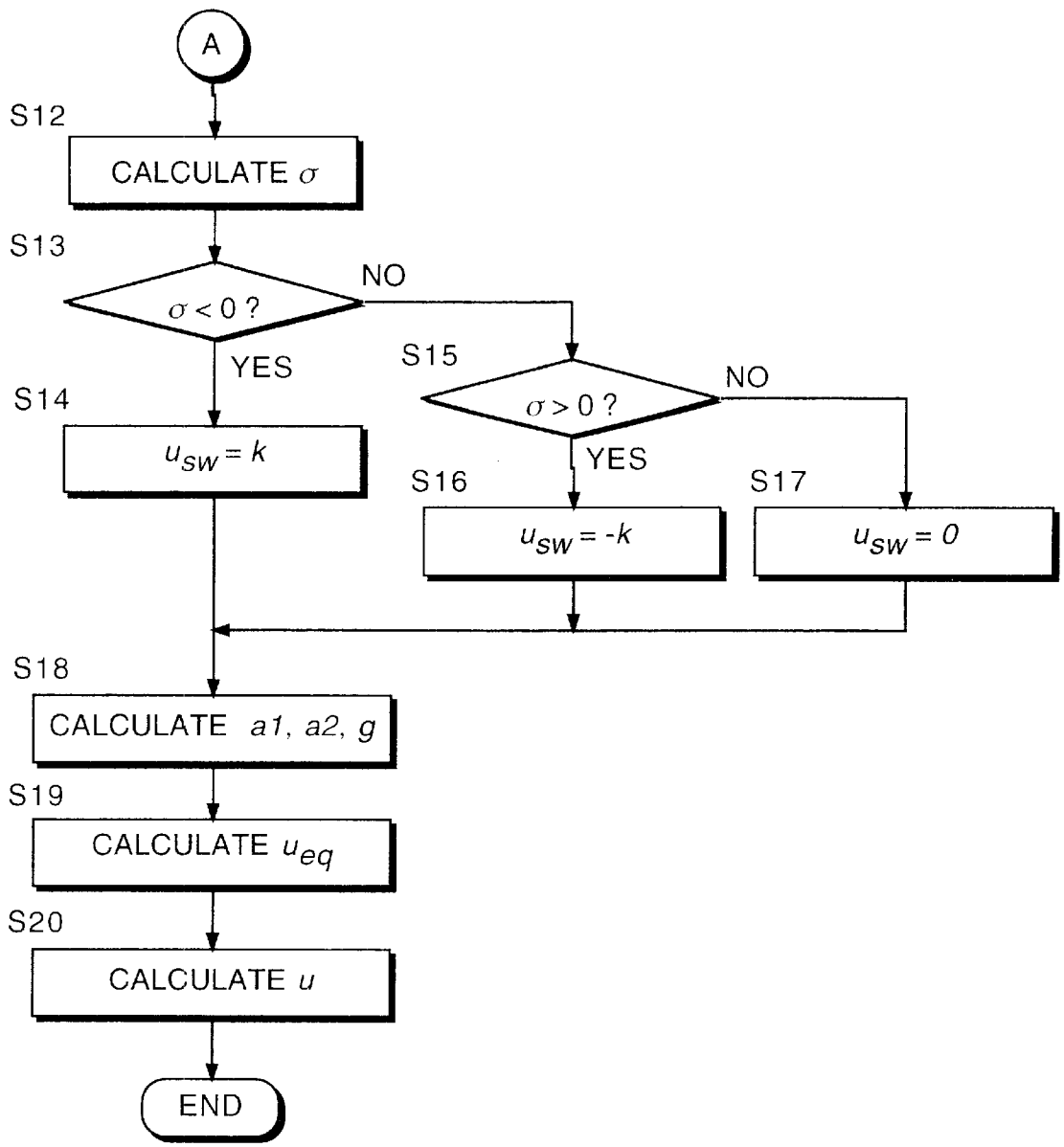

The controller 80 performs the above control by executing the speed ratio control routine shown in FIGS. 7A and 7B. This routine is performed at an interval of twenty milliseconds.

Referring to FIG. 7A, first in a step S1, the controller 80 reads the gyration angle $\phi$ of the power rollers 18C, 18D, 20C, 20D, the offset distance y of the trunnion 23 from the neutral position, the accelerator pedal depression amount APS, the rotation speed $\omega_{co}$ of the output disks 18B, 20B, the rotation speed $\omega_{ci}$ of the input disks 18A, 20A and line pressure PI from the signals input from the sensors.

Here, the relations shown by the following equations (27), (28) exist between the rotation speed $\omega_{co}$ of the output disks 18B, 20B, the rotation speed $\omega_{pr}$ of the power rollers 18C, 18D, 20C, 20D, and the rotation speed $\omega_{ci}$ of the input disks 18A, 20A.

$$\omega_{ci} = \frac{c_{g0} - \cos(c_{g1} - \phi)}{c_{g0} - \cos\phi} \cdot \omega_{co} \quad (27)$$

$$\omega_{pr} = \frac{c_{g0} - \cos(c_{g1} - \phi)}{c_{g2}} \cdot \omega_{co} \quad (28)$$

where $c_{g0}$, $c_{g1}$, $c_{g2}$=constants depending on the construction of the TCVT 10.

Therefore, if two of the four parameters, the rotation speed $\omega_{co}$ of the output disks 18B, 20B, the rotation speed $\omega_{pr}$ of the power rollers 18C, 18D, 20C, 20D, the rotation speed $\omega_{ci}$ of the input disks 18A, 18B and the gyration angle $\phi$ of the power rollers 18C, 18D, 20C, 20D are known, the two remaining parameters may be calculated by the equations (27), (28).

Now, in a following step S2, the controller 80 calculates the vehicle speed VSP by the equation (17).

In a following step S3, the final input rotation speed $t\omega_1$ is determined by looking up the map of FIG. 6 from the accelerator pedal depression amount APS and vehicle speed VSP.

In a following step S4, the final control variable tz is calculated by the equation (18), from the final input rotation speed $t\omega_i$ and the rotation speed $\omega_{co}$ of the output disks 18B, 20B.

In a following step S5, the target control variable $\dot{z}^*$ is obtained by processing the final control variable tz by the lowpass filter of the equation (19).

In a following step S6, the differential $\dot{z}^*$ of the target control variable z* is calculated. The difference between the immediately preceding value $z^*_{-1}$ of the target control variable z* calculated on the immediately preceding occasion the routine was executed and the target control variable z* calculated on the present occasion may be considered as the differential $\dot{z}^*$, or the target control variable z* may be differentiated using a pseudo-differentiator.

In a following step S7, the control variable z is calculated from the rotation speed $\omega_{ci}$ of the input disks 18A, 20A, and the rotation speed $\omega_{co}$ of the output disks 18B, 20B. As mentioned above, the control variable z can be considered to be the speed ratio G of the TCVT 10. Therefore, the control variable z can be calculated by the equation (5).

In a following step S8, the rotation acceleration $\dot{\omega}_{co}$ of the output disks 18B, 20B is calculated. This calculation can be performed by the equation (29) using the difference between the preceding value of the rotation speed $\omega_{co-1}$ of the output disks 18B, 20B read on the immediately preceding occasion the routine was executed, and the rotation speed $\omega_{co}$ of the output disks 18B, 20B read on the present occasion the routine is executed. The calculation can be performed using a pseudo-differentiator or an observer.

$$\dot{\omega}_{co} = \frac{\omega_{co} - \omega_{co-1}}{T} \quad (29)$$

where, T=execution interval of the routine=twenty milliseconds.

In a following step S9, the partial differential derivative $$\frac{\partial h}{\partial \phi}$$

is calculated by the equation (7) from the gyration angle $\phi$ of the power rollers 18C, 18D, 20C, 20D. The time differential $$\frac{d}{dt}\left(\frac{\partial h}{\partial \phi}\right)$$

is calculated by the equation (9).

$$\frac{\partial f}{\partial \phi}$$

is calculated by the equation (13), and $$\frac{\partial f}{\partial \omega_{co}}$$

is calculated by the equation (14). These calculations may alternatively be performed by looking up maps prestored in the controller 80.

In a following step S10, the coefficient f is calculated by the equation (4) from the rotation speed $\omega_{co}$ of the output disks 18B, 20B, and the gyration angle $\phi$ of the power rollers 18C, 18D, 20C, 20D. The time differential $\dot{f}$ of the coefficient f is calculated by the equation (12) using the coefficient f, offset distance y of the trunnion 23 from the neutral position, rotation acceleration $\dot{\omega}_{co}$ of the output disks 18B, 20B calculated in the step S8, and partial differential derivatives $$\frac{\partial f}{\partial \phi} \text{ and } \frac{\partial f}{\partial \omega_{co}}$$

calculated in the step S9.

As mentioned above, in this calculation, the rotation acceleration $\dot{\omega}_{co}$ of the output disks 18B, 20B may be regarded as zero.

In a following step S11, the control variable differential $\dot{z}$ is calculated using the equation (16) from the partial differential derivative $$\frac{\partial h}{\partial \phi}$$

calculated in the step S9, coefficient f, and offset distance y of the trunnion 23 from the neutral position.

Next, referring to FIG. 7B, in a step S12 following the step S11, the controller 80 calculates control error σ using the equation (20) from the control variable differential $\dot{z}$ calculated in the step S11, the control variable z calculated in the step S7 and the target control variable z* calculated in the step S5.

The processing of steps S13 to step S17 is related to the calculation of the control error compensation amount $u_{sw}$ by the equation (22).

First, in the step S13, the controller 80 determines whether or not the control error σ is a negative value. When the control error σ is a negative value, the controller 80 performs the processing of the step S14. When the control error σ is not a negative value, the controller 80, in the step S15, determines whether or not the control error σ is a positive value. When the control error σ is a positive value, the controller 80 performs the processing of the step S16, and when the control error σ is not a positive value, i.e., in the case of zero, it performs the processing of the step S17.

In the step S14, the control error compensation amount $u_{sw}$ is set equal to a constant k. The constant k is a value corresponding to the maximum displacement amount of the step motor 52. In the step S16, the control error compensation amount $u_{sw}$ is set equal to a constant -k. In the step S17, the control error compensation amount $u_{sw}$ is set to zero.

Figure 8A:
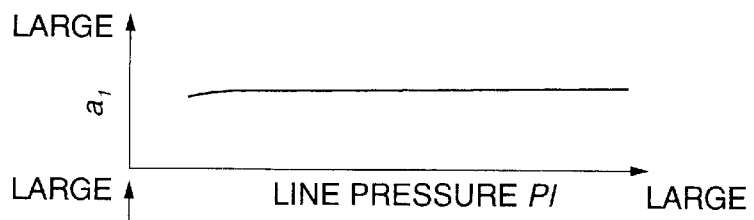
FIGS. 8A–8C are diagrams showing the characteristics of a map of the parameters $a_1$, $a_2$, g stored by the controller.
Figure 8B:
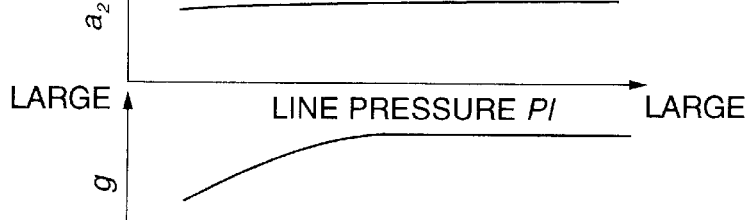
Figure 8C:

After determining the control error compensation amount $u_{sw}$ in this way, in a step S18, the controller 80 calculates the parameters $a_1$, $a_2$, g by looking up maps having the characteristics shown in FIGS. 8A–8C from the line pressure Pl. These maps are prestored in the memory of the controller 80.

In the following step S19, the command value u to the step motor 52 is calculated using the equation (26), and the equivalent input $u_{eq}$ is set equal to the computed command value u.

In a final step S20, the controller 80 outputs the sum of the control error compensation amount $u_{sw}$ and equivalent input $u_{eq}$ as the command value u to the step motor 52.

After processing of the step S20, the controller 80 terminates the routine.

Due to this control routine, an effectively fixed speed change response is obtained regarding speed ratio variation towards a certain target speed ratio regardless of the present speed ratio or the variation amount between the present speed ratio and the target speed ratio.

Figure 9:
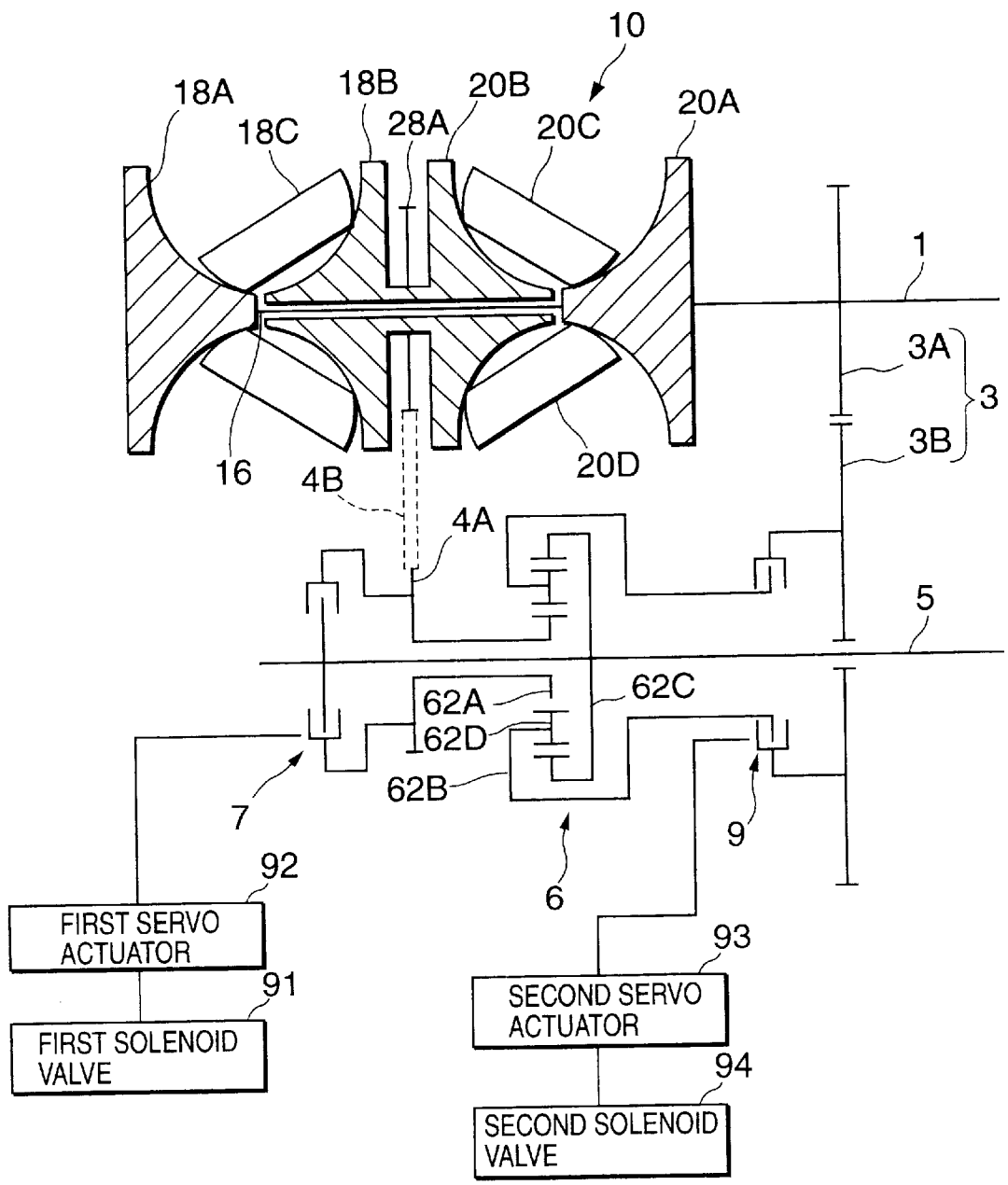
FIG. 9 is a schematic diagram of an infinitely variable transmission according to which a second embodiment of this invention is applied.

Next, a second embodiment with respect to the control of the speed ratio of an infinitely variable transmission (IVT) will be described, referring to FIG. 9.

The IVT comprises an IVT input shaft 1A, a TCVT 10 similar to the first embodiment, a fixed speed ratio transmission 3, a planetary gear set 6 and an IVT output shaft 5. The IVT input shaft 1A is joined to the engine, and rotates together with the torque transmission shaft 16 of the TCVT 10.

The fixed speed ratio transmission 3 comprises an input gear 3A which meshes with the input gear 3A fixed to the IVT input shaft 1A, and output gear 3B which is supported by the IVT output shaft 5 free to rotate.

The TCVT 10 essentially has the same construction as that of the TCVT 10 of the first embodiment, however it differs in that an output sprocket 28A is provided instead of the output gear 28.

The rotation of the output sprocket 28A is transmitted to the IVT output shaft 5 via a chain 4B on a sprocket 4A supported free to rotate on the IVT output shaft 5.

The planetary gear set 6 is provided with a sun gear 62A connected with the sprocket 4A, a carrier 62B connected with the output gear 3B of the fixed speed ratio transmission 3 via a power recirculation clutch 9, and a ring gear 62C fixed to the IVT output shaft 5. The sun gear 62A is an external contact gear, the ring gear 62C is an internal contact gear, and the carrier 62B supports plural planet gears 62D interposed between these gears such that they are free to rotate and turn around the outer circumference of the sun gear 62A.

The sun gear 62A is supported free to rotate on the IVT output shaft 5 in the same way as the sprocket 4A. The sprocket 4A is connected with the IVT output shaft 5 via a direct clutch 7.

The direct clutch 7 is engaged or disengaged by a first servo actuator 92 according to the oil pressure supplied from a first solenoid valve 91. The power recirculation clutch 9 is engaged or disengaged by a second servo actuator 93 according to the oil pressure supplied from a second solenoid valve 94. In a direct mode, wherein the direct clutch 7 is engaged and the power recirculation clutch 9 is disengaged, the power output of the TCVT 10 is output to the IVT output shaft 5 as it is via the direct clutch 7. In the power recirculation mode, wherein the direct clutch 7 is disengaged and the power recirculation clutch 9 is engaged, the rotation of a ring gear 62C is output by the IVT output shaft 5 according to the relative rotation of the carrier 62B connected with the output gear 3B of the fixed speed ratio transmission 3, and the sun gear 62A connected with the output sprocket 28A of the TCVT 10.

The dynamic characteristics of the variation of the gyration angle $\phi$ of the power rollers 18C, 18D, 20C, 20D relative to the displacement u of the step motor are expressed by the equation (1) and equation (2) as in the first embodiment.

The speed ratio i of the IVT in the power recirculation mode is expressed by the following equation (30).

$$i = \frac{c_{g2} \cdot (c_{g0} - \cos\phi)}{c_{g3} \cdot (c_{g0} - \cos\phi) - c_{g4} \cdot \{c_{g0} - \cos(2 \cdot c_{g1} - \phi)\}} \quad (30)$$

where, $C_{g0}$, $C_{g1}$, $C_{g2}$, $C_{g3}$, $C_{g4}$=constants depending on the construction of the IVT.

In the direct mode, the output of the TCVT 10 is the output of the IVT, so the IVT speed ratio i has the same characteristics as the speed ratio G of the equation (3).

Therefore, in the speed ratio control of the IVT, the control depending on the equation (30) and control depending on the equation (3) are changed over according to the operating mode.

The control variable z may be the IVT speed ratio i, or the inverse $i_I$ of the IVT speed ratio i. The partial differential derivative of the control variable z with respect to the gyration angle φ changes with these differences, but the partial differential derivative can easily be calculated by partially differentiating the control variable z with respect to the gyration angle φ. Therefore, the calculation of the partial differential derivative is not described in detail here.

The control variable z in the power recirculation mode when the control variable z is the IVT speed ratio i, is expressed by the following equation (31).

$$z = h_{ip}(\phi) = \frac{c_{g2} \cdot (c_{g0} - \cos\phi)}{c_{g3} \cdot (c_{g0} - \cos\phi) - c_{g4} \cdot \{c_{g0} - \cos(2 \cdot c_{g1} - \phi)\}} \quad (31)$$

The control variable z in the direct mode when the control variable z is the IVT speed ratio i, is expressed by the equation (6) deduced from the equation (3).

The controller 80 first calculates, in the target value generating unit 109 of FIG. 4, an IVT output shaft rotation speed $\omega_{io}$. In the power recirculation mode, it is calculated from the rotation speed $\omega_{co}$ of the output disk 18B, 20B and a gear ratio of the planetary gear set 6. In the direct mode, it is calculated by multiplying the rotation speed $\omega_{co}$ of the output disk 18B, 20B by a predetermined factor.

Next, the final input rotation speed $t\omega_i$ is calculated from the accelerator pedal depression amount APS and vehicle speed VSP using the map of FIG. 6. The final control variable tz is then calculated by the following equation (32).

$$tz = \frac{t\omega_i}{\omega_{io}} \quad (32)$$

On the other hand, the control variable z in the power recirculation mode when the control variable z is the inverse $i_I$ of the IVT speed ratio i, is expressed by the following equation (33).

$$z = h_{iip}(\phi) = c_{g5} - c_{g6} \cdot \frac{c_{g0} - \cos(2 \cdot c_{g1} - \phi)}{c_{g0} - \cos\phi} \quad (33)$$

where, $C_{g5}$, $C_{g6}$=constants depending on the construction of the IVT.

The control variable z in the direct mode when the control variable z is the inverse $i_I$ of the IVT speed ratio i, is expressed by the following equation (34).

$$z = h_{iid}(\phi) = \frac{c_{g0} - \cos\phi}{c_{g0} - \cos(2 \cdot c_{g1} - \phi)} \quad (34)$$

When the control variable z is the inverse $i_I$ of the IVT speed ratio, the controller 80 calculates, in the target value generating unit 109 of FIG. 4, the final input rotation speed $t\omega_i$ and IVT output rotation speed $\omega_{io}$ as described above. Then, the controller 80 calculates the final control variable tz from the final input rotation speed $t\omega_i$ and the IVT output rotation speed $\omega_{io}$ by the following equation (35).

$$tz = \frac{\omega_{io}}{t\omega_i} \quad (35)$$

The process for obtaining the target control variable z* from the final control variable tz is identical to that of the first embodiment.

Thus, in the IVT, as in the TCVT of the first embodiment, an essentially fixed speed change response is obtained for the speed ratio variation relative to a certain target speed ratio regardless of the present speed ratio or the variation amount between the present speed ratio and the target speed ratio.

Here, the difference between the first and second embodiments according to this invention, and the above mentioned prior art example will be described.

In the prior art example, a second differential with respect to time of the equation (3) was calculated, and the equation (1) and equation (2) were substituted to obtain the following equation (36).

$$\ddot{G} = \frac{d}{dt}\left(\frac{\partial h}{\partial \phi}\right) \cdot f \cdot y + \frac{\partial h}{\partial \phi} \cdot \dot{f} \cdot y + \frac{\partial h}{\partial \phi} \cdot f \cdot g \cdot (u - a_i \cdot \phi - a_2 \cdot y) \quad (36)$$

In equation (36), a control rule is deduced based on the assumptions of the following equations (37), (38).

$$\frac{d}{dt}\left(\frac{\partial h}{\partial \phi}\right) = 0 \quad (37)$$

$$\dot{f} = 0 \quad (38)$$

Consequently, a transfer function W(σ) from a target speed ratio G* to the speed ratio G is expressed by the following equation (39).

$$W(s) = \frac{k_1 \cdot s - k_0}{s^3 + k_2 \cdot s^2 + k_1 \cdot s + k_0} \quad (39)$$

where, $k_0$, $k_1$, $k_2$=constants, and s=Laplacian operator.

The assumptions of the equation (6) and equation (7) are exactly the same as designing the control system considering that the component of velocity during a speed change transient state is zero. The coefficient f of equation (36) is time-variant, and it exhibits a nonlinear variation with respect to the gyration angle φ. Therefore, when the assumptions specified by the equation (6) and equation (7) do not hold, the response of the speed ratio variation relative to the control output of the controller 80 is not linear.

Figure 21:
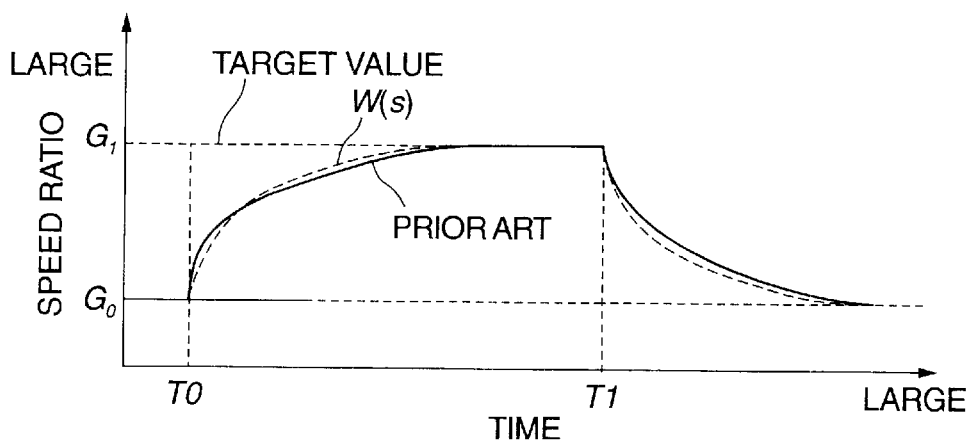
FIG. 21 is a timing chart describing a response delay in the speed ratio control according to a prior art.

For example, referring to FIG. 21, the response of the real speed ratio G when the target speed ratio is changed from a speed ratio $G_0$ for high speed to a speed ratio $G_1$ for low speed in the prior art tends to be faster in the early stage and tends to be delayed in the latter stage of the speed change, as compared to a linear system W(σ) shown by a broken line in the diagram. The response of the real speed ratio G when the target speed ratio is changed from the speed ratio $G_1$ for low speed to the speed ratio $G_0$ for high speed tends to be faster in the latter half of the speed change.

Thus, if the trackability of the real speed ratio relative to the variation of target speed ratio changes, the driver will experience an uncomfortable feeling during a speed change. Such a difference in trackability is based on the assumptions of the equation (6) and equation (7).

In the first and second embodiments, the coefficient computing unit 101 first computes the time-variant coefficient f. The time differential $$\frac{d}{dt}\left(\frac{\partial h}{\partial \phi}\right)$$

of the partial differential derivative $$\frac{\partial h}{\partial \phi}$$

which was assumed to be zero in the equation (37) according to the prior art example, is computed by the partial differential computing unit 104 from the coefficient f, the displacement y of the trunnion and the gyration angle $\phi$. Moreover, the time differential $\dot{f}$ of the coefficient f which was assumed to be zero in the equation (38) according to the prior art example, is computed by the coefficient differential computing unit 105 from the displacement y, gyration angle $\phi$ and the rotation speed $\omega_{co}$ of the output disks 18B, 20B. Using these values, the equivalent input computing unit 106 calculates the equivalent input $u_{eq}$, and the displacement computing unit 111 determines the command signal u using the equivalent input $u_{eq}$, so the response of the real variation amount z relative to the target value z* always coincides with predetermined characteristics. Therefore, the speed change response is neither faster nor slower than the target linear response as it was in the prior art example.

The control gain which is corrected by the gain correction unit 107, i.e., by the partial differential derivative computing unit 104 and the coefficient differential computing unit 105, is a feedback gain of the offset distance y of the trunnion 23 from the neutral position. If this feedback gain is $k_y$, the details of the compensation will vary depending on the nature of the target value z*.

When the target value z is the speed ratio, the relation between the feedback gain $k_y$ and the correction amount is expressed by the following equation (40).

$$k_y = c \cdot \left\{ a_2 - \frac{\frac{d}{dt}\left(\frac{\partial h}{\partial \phi}\right)}{\frac{\partial h}{\partial \phi} \cdot g} - \frac{\dot{f}}{f \cdot g} \right\} \quad (40)$$

where,
- $a_2$=constant determined by the link ratio of the precess cam 52 and the mechanical feedback mechanism,
- g=valve gain, and
- c=constant.

In this case, the term comprising $$\frac{\partial h}{\partial \phi}$$

and the time differential ($\dot{f}$) of the coefficient f are corrected.

When the target value is the gyration angle $\phi$ of the power rollers 18C, 18D, 20C, 20D as in a third embodiment described next, the relation between the feedback gain $k_y$ and correction amount is expressed by the following equation (41).

$$k_y = c \cdot \left(a_2 - \frac{\dot{f}}{f \cdot g}\right) \quad (41)$$

In this case, the term comprising the time differential $\dot{f}$ of the coefficient f is corrected.

Next, the third embodiment of this invention will be described, referring to FIG. 10, FIGS. 11A and 11B.

The construction of the hardware in this embodiment is identical to that of the first embodiment. In this embodiment, the control variable z is the gyration angle $\phi$ of the power rollers 18C, 18D, 20C, 20D.

Figure 10:
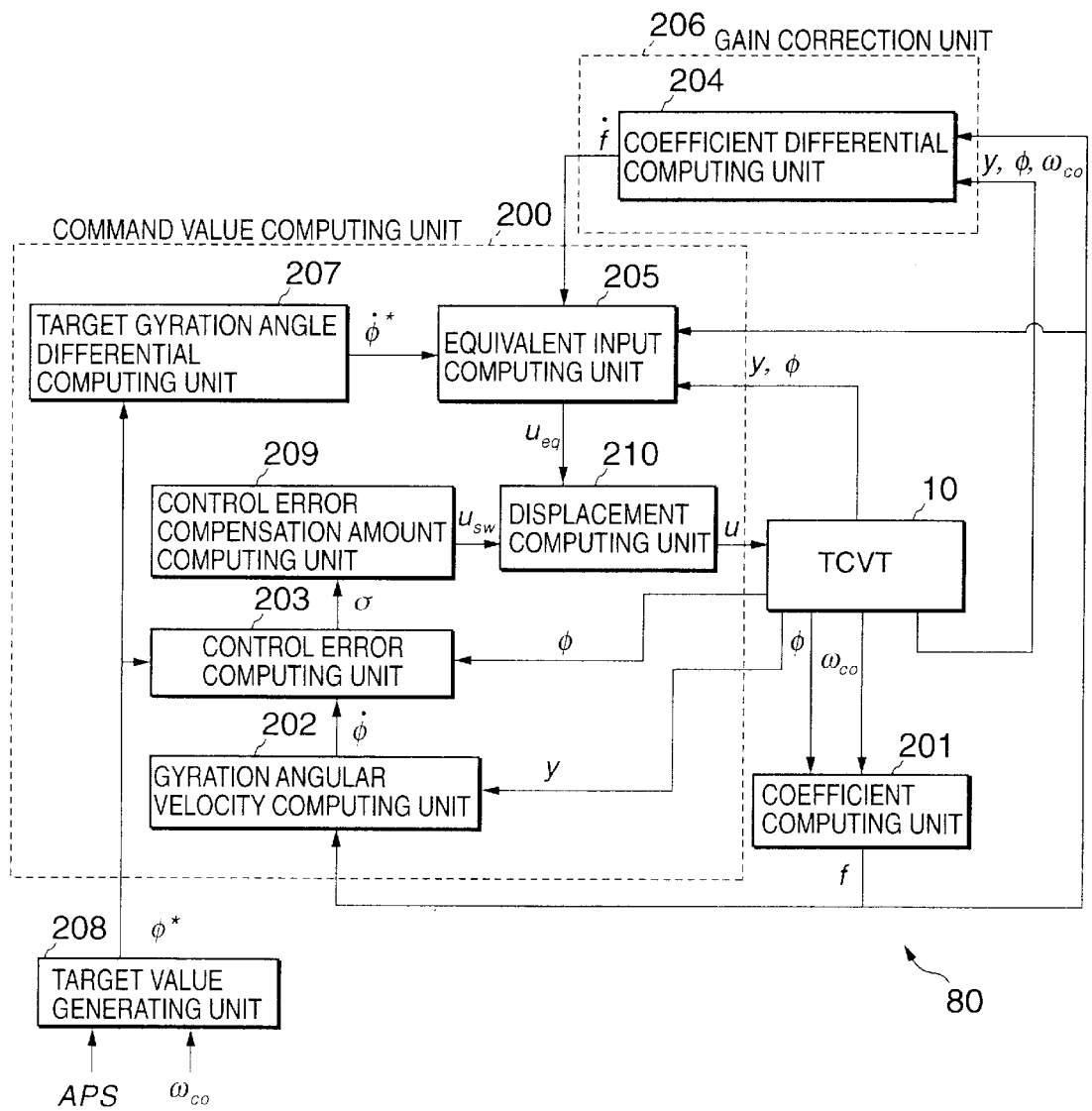
FIG. 10 is a block diagram describing the function of the controller according to a third embodiment of this invention.

In FIG. 10, the dynamic characteristic of the variation of the gyration angle $\phi$ of the power rollers 18C, 18D, 20C, 20D relative to the displacement u of the step motor is expressed by the equation (1) and equation (2) as in the above-mentioned prior art example.

A coefficient computing unit 201 and a coefficient differential computing unit 204 shown in FIG. 10 correspond to the coefficient computing unit 101 and coefficient differential computing unit 105 of the first embodiment.

A target value generating unit 208 calculates a target gyration angle $\phi^*$ from the accelerator pedal depression amount APS and the rotation speed $\omega_{co}$ of the output disk.

A target gyration angle differential computing unit 207 as a part of a command value computing unit 200 calculates a differential $\dot{\phi}^*$ of the target gyration angle $\phi^*$ by the following process.

First, the vehicle speed VSP is calculated from the rotation speed $\omega_{co}$ of the output disk by the equation (17).

Next, the final input rotation speed $t\omega_i$ is calculated using the map having the characteristics shown in FIG. 6 from the accelerator pedal depression amount APS and vehicle speed VSP. Next, a final speed ratio $t_G$ is calculated by the following equation 42 which corresponds to the equation (18), from the final input rotation speed $t\omega_i$ and rotation speed $\omega_{co}$ of the output disks 18B, 20B.

$$t_G = \frac{t\omega_i}{\omega_{co}} \quad (42)$$

Figure 5:
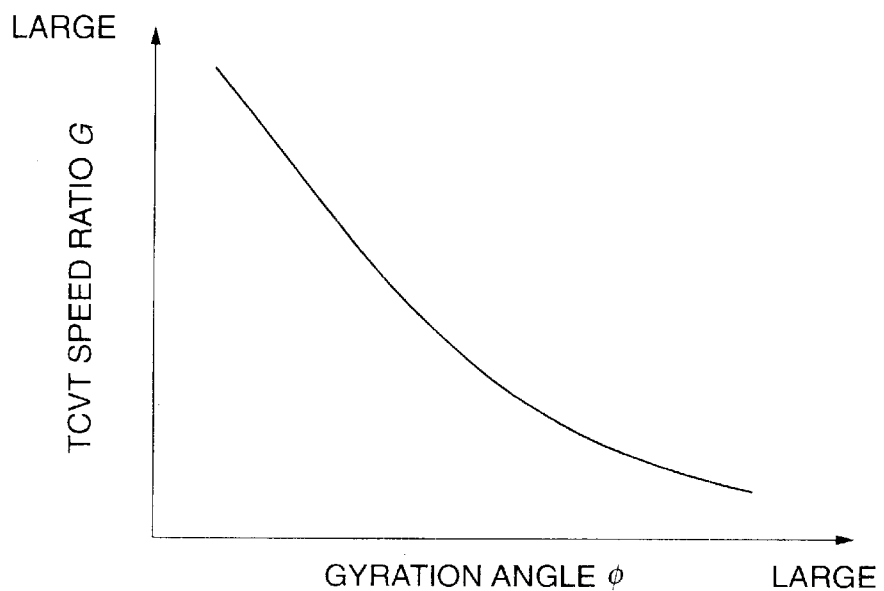
FIG. 5 is a diagram showing the characteristics of a map stored by the controller, specifying the relation between a gyration angle and a speed ratio.

The final speed ratio $t_G$ is then converted to the final gyration angle $t\phi$ using the equation (3) or the map of FIG. 5. Finally, the differential $\dot{\phi}^*$ of the target gyration angle $\phi^*$ is calculated from the final gyration angle $t\phi$, using the following equation (43):

$$\dot{\phi}^* = -c_f \cdot \phi^* + c_f \cdot t\phi \quad (43)$$

where, $c_f$=cutoff frequency of lowpass filter.

A gyration angular velocity computing unit 202 calculates the time differential $\dot{\phi}$ of the gyration angle $\phi$, i.e., the gyration angle variation rate, from the offset distance y of the trunnion 23 from the neutral position and the coefficient f using the equation (1).

The control error computing unit 203 calculates the control error $\sigma$ using the gyration angle $\phi$, the gyration angle variation rate $\dot{\phi}$ and the target gyration angle $\phi^*$.

This calculation is performed based on the relation of the following equation (44) which is similar to the equation (20) of the first embodiment.

$$\sigma = \dot{\sigma} + c_0 \cdot (\phi - \phi^*) \quad (44)$$

where, $c_0$=first order delay time constant.

If the control error σ is assumed to be zero, the relation between the gyration angle φ, the gyration angle variation rate $\dot{\phi}$ and the target gyration angle φ* is expressed by the following equation (45).

$$\dot{\phi} = -c_0 \cdot \phi + c_0 \cdot \phi^* \qquad (45)$$

Equation (45) shows that the gyration angle φ has a first order delay response relative to the target gyration angle φ*, when the control error σ is zero.

A control error compensation amount computing unit 209 calculates the control error compensation amount $u_{sw}$ using the same equation (22) as that of the first embodiment from the control error σ.

An equivalent input computing unit 205 calculates the equivalent input $u_{eq}$ corresponding to the command signal to the step motor when the control error σ is a fixed value, from the gyration angle φ, offset distance y of the trunnion 23 from the neutral position, coefficient f and target gyration angle φ*.

For this calculation, a second differential of the equation (1) is calculated to obtain the following equation (46).

$$\ddot{\phi} = \dot{f} \cdot y + f \cdot \dot{y} \qquad (46)$$

Substituting the equation (2) in the equation (46), the following equation (47) is obtained.

$$\ddot{\phi} = \dot{f} \cdot y + f \cdot g \cdot (u - a_1 \cdot \phi - a_2 \cdot y) \qquad (47)$$

By calculating a second differential of the equation (44), the following equation (48) is obtained.

$$\ddot{\sigma} = \ddot{\phi} + c_0 \cdot \dot{\phi} - c_0 \cdot \dot{\phi}^* \qquad (48)$$

Here, it is assumed that the control error σ is fixed, so the control error differential $\dot{\sigma}$ is zero. Therefore, the following equation (49) is obtained from the equation (48).

$$\ddot{\phi} = -c_0 \cdot \dot{\phi} + c_0 \cdot \dot{\phi}^* \qquad (49)$$

If the equation (47) and equation (49) are solved for the command signal u of the step motor, the following equation (50) is obtained.

$$u = \left(a_2 - \frac{\dot{f}}{f \cdot g}\right) \cdot y - \frac{c_0}{f \cdot g} \cdot (\dot{\phi} - \dot{\phi}^*) + a_1 \cdot \phi \qquad (50)$$

The equivalent input computing unit 205 inputs the command value u of the step motor calculated by the equation (50) as an equivalent input $u_{eq}$ into a displacement computing unit 210. In the above mentioned prior art example, the differential $\dot{f}$ of the coefficient f was assumed to be zero, but in this embodiment, the equivalent input $u_{eq}$ is calculated using the value $\dot{f}$ which the coefficient differential computing unit 204 of the gain correction unit 206 calculated, as shown in the equation (50).

The displacement computing unit 210 outputs the sum of the control error compensation amount $u_{sw}$ which the control error compensation amount computing unit 209 calculated, and the equivalent input $u_{eq}$ which the equivalent input computing unit 106 calculated, as the step motor displacement command value u to the step motor of the TCVT 10.

Next, the speed ratio control routine which the controller 80 performs in order to realize the above control will be described referring to FIGS. 11A and 11B. This routine is performed at an interval of twenty milliseconds.

Figure 11A:
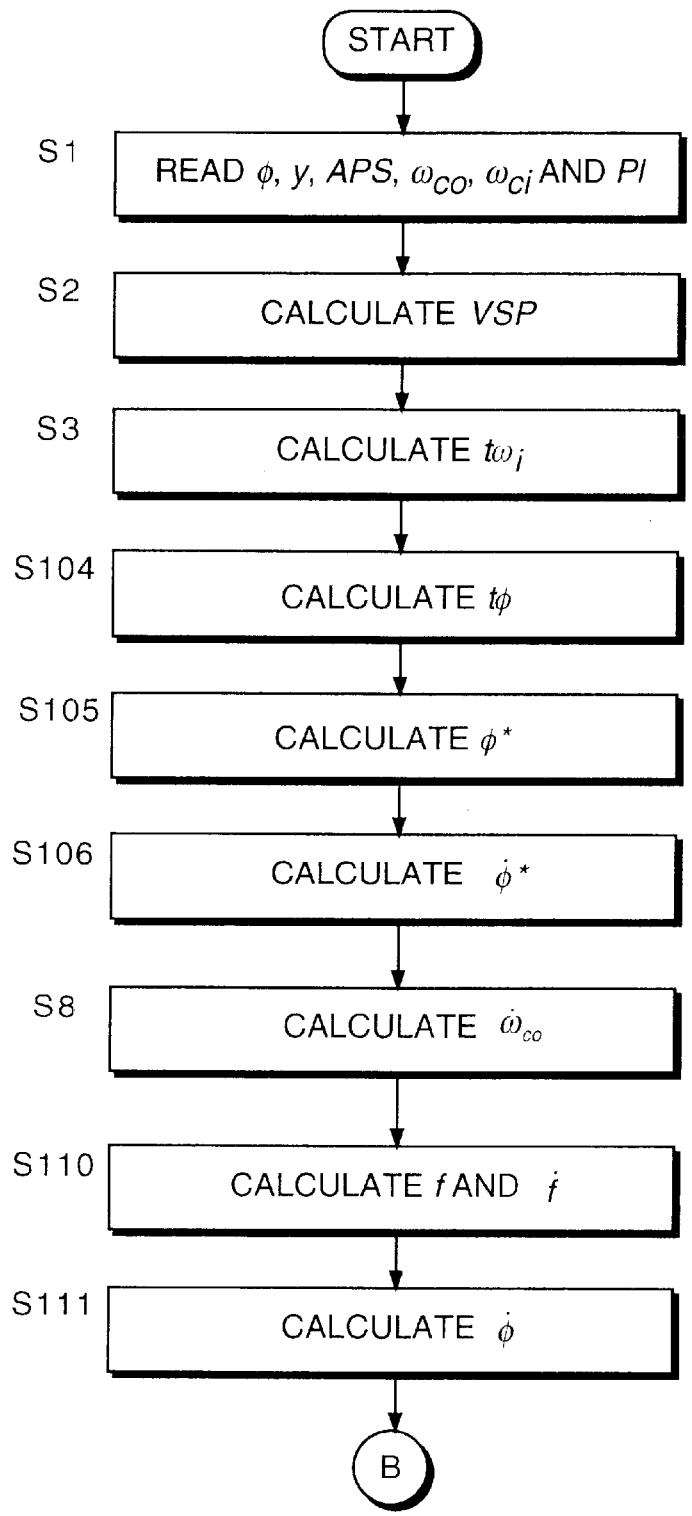
FIGS. 11A and 11B are similar to FIGS. 7A and 7B, but showing the third embodiment of this invention.
Figure 11B:
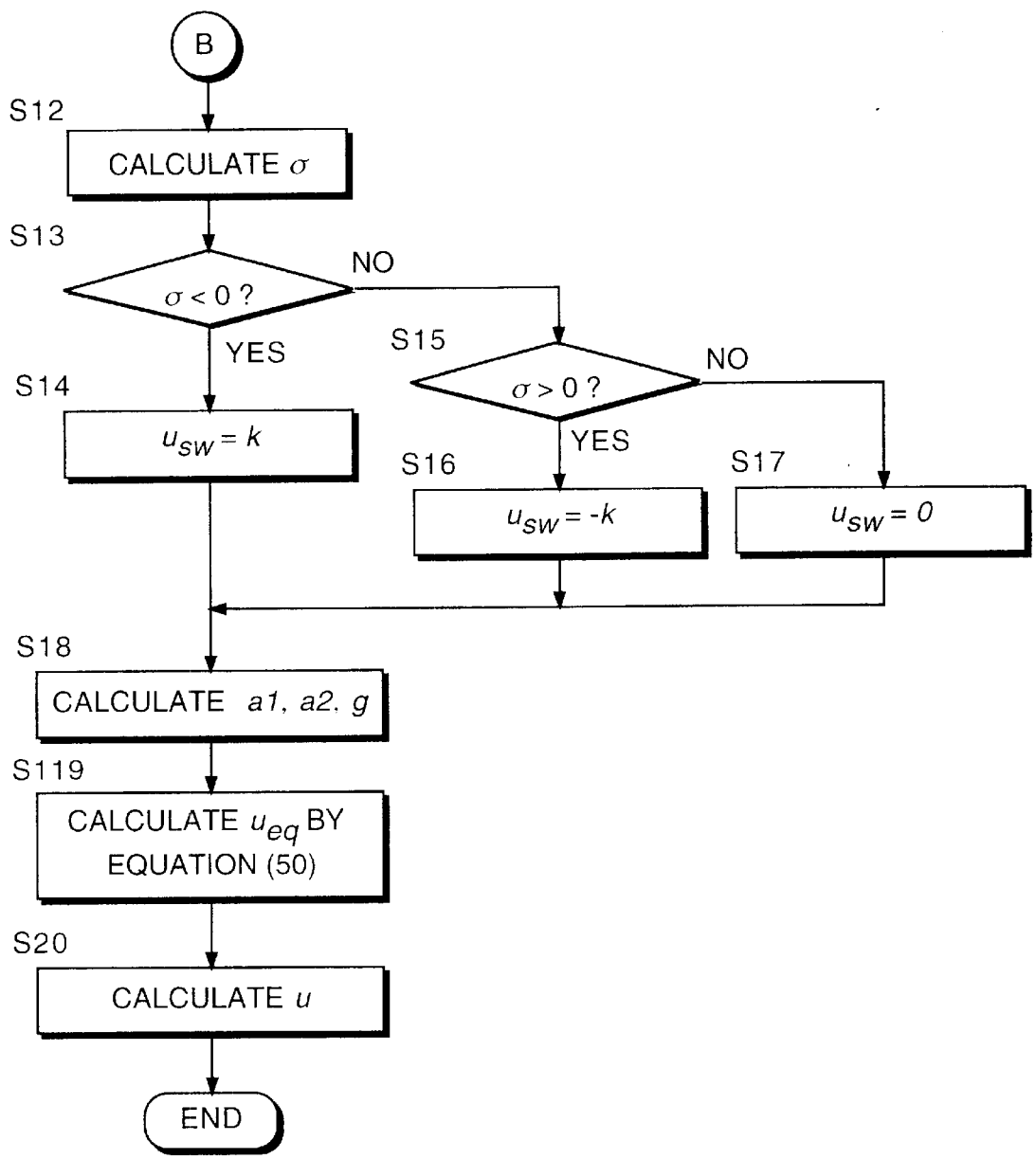

In FIGS. 11A and 11B, identical numbers are given to steps which perform the same processing as FIGS. 7A and 7B of the first embodiment, different step numbers being given only to steps which perform different processing from the routine of FIGS. 7A and 7B.

Referring to FIG. 1A, the steps S1, S3 are identical to the steps S1, S3 of the first embodiment.

In a step S104 which replaces the step S4 of the first embodiment, the final speed ratio $t_G$ is calculated by the equation (42) from the final input rotation speed $t\omega_i$ and the rotation speed $\omega_{co}$ of the output disks 18B, 20B. The final speed ratio $t_G$ is converted to the final gyration angle $t\phi$ by looking up the map of FIG. 5.

In a step S105 which replaces the step S5 of the first embodiment, the target gyration angle φ* is calculated from the accelerator pedal depression amount APS and the rotation speed $\omega_{co}$ of the output disks.

In a step S106 which replaces the step S6 of the first embodiment, the target gyration angle variation rate $\dot{\phi}^*$ is calculated. Here, the difference between the immediately preceding value $\phi^*_{-1}$ of the target gyration angle φ* calculated on the immediately preceding occasion the routine was performed, and the target gyration angle φ* calculated on the present occasion, is assumed to be the variation rate $\dot{\phi}^*$. The variation rate $\dot{\phi}^*$ may be obtained by differentiating the target gyration angle φ* using a pseudo-differentiator, or by directly calculating the variation rate $\dot{\phi}^*$ using the equation (43).

In the first embodiment, the control variable z is computed in the step S7, but in this embodiment, the gyration angle φ corresponding to the control variable z is read in the step S1, so the step S7 is omitted.

The following step S8 is the same as that of the first embodiment.

In the first embodiment, the partial differential derivative $$\frac{\partial h}{\partial \phi}$$

and its time differential $$\frac{d}{dt}\left(\frac{\partial h}{\partial \phi}\right)$$

is computed in the step S9, but in this embodiment, these values are not used, so the step S9 is omitted.

In a step S110 which replaces the step S10, the coefficient f and its time differential $\dot{f}$ are calculated. The calculation process is the same as that of the step S10 of the first embodiment, but in this embodiment, the step S9 is omitted, so in the step S110, $$\frac{\partial f}{\partial \phi}$$

is calculated by the equation (13) and $$\frac{\partial f}{\partial \omega_{co}}$$

is calculated by the equation (14), and the calculation of the equation (12) is performed.

In a step S111 which replaces the step S11, the gyration angle variation rate $\dot{\phi}$ is calculated, using the equation (1), from the offset distance y of the trunnion 23 from the neutral position read in the step S1 and the coefficient f calculated in the step S110.

Next, referring to FIG. 11B, steps S12–S18 which set the control error compensation amount $u_{sw}$ are identical to those of the steps S12–S18 of the first embodiment.

In a step S119 which replaces the step S19 of the first embodiment, the command value u to the step motor is calculated using the equation (50), and the equivalent input $u_{eq}$ is set equal to the command value u.

A step S20 is identical to the step S20 of the first embodiment, and the sum of the control error compensation amount $u_{sw}$ and equivalent input $u_{eq}$ is computed as the command value u to the step motor. After the processing of the step S20, the controller 80 terminates the routine.

Due to the processing of this control routine, even when the control variable is the gyration angle $\phi$, regarding the variation relative to the target gyration angle $\phi^*$ of the gyration angle $\phi$, an essentially fixed response relative to the displacement of the step motor is obtained.

Next, a fourth embodiment of this invention will be described referring to FIGS. 12–14.

The construction of the hardware in this embodiment is identical to that of the third embodiment, only the details of the processing of the controller 80 being different.

In this embodiment, the speed ratio G of the TCVT 10 is set to the control variable z.

Figure 12:
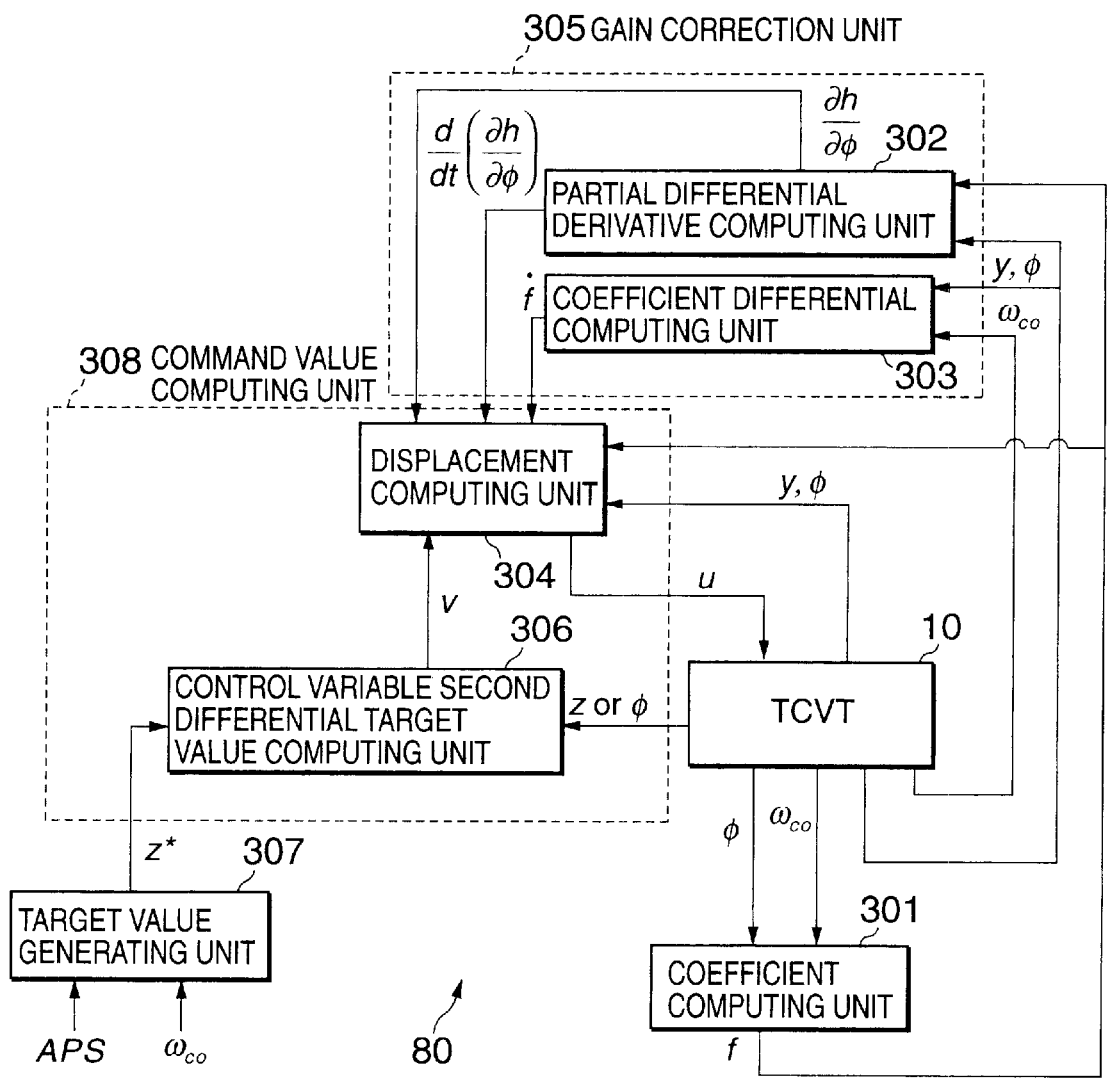
FIG. 12 is a block diagram describing the function of the controller according to a fourth embodiment of this invention.

The controller 80 is provided with a coefficient computing unit 301, a gain correction unit 305 comprising a partial differential derivative computing unit 302 and a coefficient differential computing unit 303, a command value computing unit 308 comprising a displacement computing unit 304 and a control variable second differential target value computing unit 306, and a target value generating unit 307, as shown in FIG. 12.

Of these, the coefficient computing unit 301, the partial differential derivative computing unit 302, the coefficient differential computing unit 303 and the target value generating unit 307 are identical to the coefficient computing unit 101, partial differential derivative computing unit 104, coefficient differential computing unit 105 and target value generating unit 109 of the first embodiment.

The displacement computing unit 304 calculates the step motor displacement command value u from the gyration angle $\phi$ of the power roller, offset distance y of the trunnion 23 from the neutral position, coefficient f calculated by the coefficient computing unit 301, partial differential derivative $$\frac{\partial h}{\partial \phi}$$

calculated by the partial differential derivative computing unit 302, coefficient differential $\dot{f}$ calculated by the coefficient differential computing unit 303, and control variable second differential target value v calculated by the control variable second differential target value computing unit 306.

The second differential derivative of the control variable z is identical to that of the equation (25) of the first embodiment.

Substituting the equation (2) in the equation (25), the following equation (51) is obtained.

$$\ddot{z} = \frac{d}{dt}\left(\frac{\partial h}{\partial \phi}\right) \cdot f \cdot y + \frac{\partial h}{\partial \phi} \cdot \dot{f} \cdot y + \frac{\partial h}{\partial \phi} \cdot f + g \cdot (u - a_1 \cdot \phi - a_2 \cdot y) \qquad (51)$$

In the equation (51), if the control variable second differential target value v is input virtually, the relation of the following equation (52) will be satisfied.

$$\ddot{z} = v \qquad (52)$$

From the equation (51) and equation (52), the following equation (53) is obtained.

$$v = \frac{d}{dt}\left(\frac{\partial h}{\partial \phi}\right) \cdot f \cdot y + \frac{\partial h}{\partial \phi} \cdot \dot{f} \cdot y + \frac{\partial h}{\partial \phi} \cdot f + g \cdot (u - a_1 \cdot \phi - a_2 \cdot y) \qquad (53)$$

If the equation (53) is solved for the step motor displacement command value u, the following equation (54) will be obtained.

$$u = \frac{v}{\frac{\partial h}{\partial \phi} \cdot f \cdot g} + \left\{ a_2 - \frac{\frac{d}{dt}\left(\frac{\partial h}{\partial \phi}\right)}{\frac{\partial h}{\partial \phi} \cdot g} - \frac{\dot{f}}{f \cdot g} \right\} \cdot y + a_1 \cdot \phi \qquad (54)$$

The differential value $\dot{f}$ of the coefficient f of the equation (54) and the time differential $$\frac{d}{dt}\left(\frac{\partial h}{\partial \phi}\right)$$

of the partial differential derivative $$\frac{\partial h}{\partial \phi}$$

is a feedback gain related to the offset distance y of the trunnion 23 from the neutral position. These values are assumed to be zero in the prior art example, respectively, but in this embodiment, the gain correction unit 305 calculates these feedback gains $\dot{f}$ and $$\frac{d}{dt}\left(\frac{\partial h}{\partial \phi}\right),$$

and the displacement computing unit 304 calculates the step motor displacement command value u using these values.

Figures 13A, 13B, 13C:
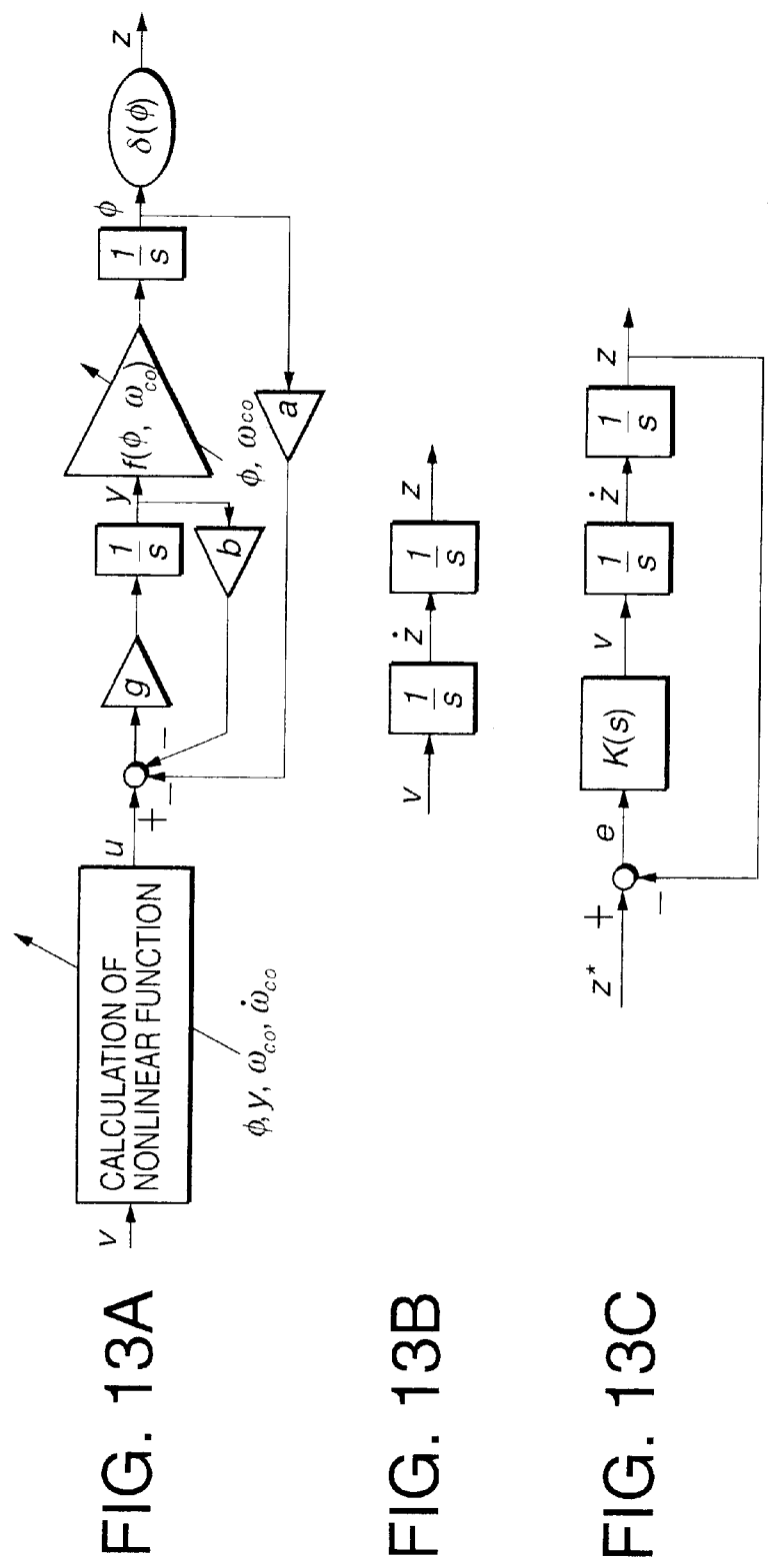
FIGS. 13A–13C are diagrams which graphically represent the speed ratio control of the controller according to the fourth embodiment of this invention.

Equation (54) corresponds to the nonlinear function computation shown in FIG. 13A. According to this calculation, the relation between the control variable second differential target value v and control variable second differential $\ddot{z}$ is linear, as shown in FIG. 13B.

Referring again to FIG. 12, the control variable second differential target value computing unit 306 computes the control variable second differential target value v from the target control variable $z^*$ and the control variable z. As mentioned above, the control variable second differential target value v and control variable second differential $\ddot{z}$ have the relation expressed by the equation (52) and FIG. 13B.

Therefore, as shown in FIG. 13C, a closed loop system wherein the control variable z has a linear response relative to the target control variable $z^*$ is designed by applying a linear controller K(s). A proportional differential controller (PD controller) is used for the controller K(s). The processing by the PD controller is expressed by the following equation (55).

$$v = -k_D \cdot \dot{z} - k_P \cdot z + k_P \cdot z^* \qquad (55)$$

where, $k_P$, $k_D$ = control constants.

The control variable differential $\dot{z}$ is calculated by the equation (16). The following equation (56) is obtained from the equation (51) and equation (55).

$$\ddot{z}=-k_D\cdot\dot{z}-k_P\cdot z+k_P\cdot z^* \tag{56}$$

Thus, the dynamic characteristics of the control variable z relative to the target control variable z* have linear characteristics as shown in the equation (56). The control constants $k_P$, $k_D$ are designed so that the equation (56) has stable, desired characteristics.

Next, the speed ratio control routine performed by the controller 80 will be described referring to FIG. 14. This routine is performed at an interval of twenty milliseconds. The control variable z is the speed ratio G of the TCVT.

The steps S1–S5 and steps S7–S11 are identical to the steps S1–S5 and steps S7–S11 of the first embodiment. In this embodiment, the differential $\dot{z}^*$ of the target control variable z* is not used, so the step S6 of the first embodiment is omitted.

In a step S40 following the step S11, a deviation e of the target control variable z* and control variable z is calculated by the following equation (57).

$$e=z^*-z \tag{57}$$

In a following step S41, the control variable second differential target value v is calculated by the following equation (58). The equation (58) is an equation deduced from the equation (55) and equation (57).

$$v=k_P\cdot e-k_D\cdot\dot{z} \tag{58}$$

The following step S18 is the same as the step S18 of the first embodiment.

In a following step S43, the step motor command value u is calculated by the equation (54).

After the processing of the step S43, the controller 80 terminates the routine.

Due to the execution of the above routine, the dynamic characteristics of the control variable z relative to the target control variable z* are the linear characteristics shown by the equation (55).

This embodiment can also be applied to the same IVT as in the second embodiment.

In control of the IVT, the calculation of the final control variable tz is different in the case where the control variable z is the IVT speed ratio i, and the case where the control variable z is the inverse $i_I$ of the IVT speed ratio i.

The control variable z in the power recirculation mode when the control variable z is the IVT speed ratio i, is expressed by the equation (31). The control variable z in the direct mode is expressed by the equation (6). The final control variable tz is expressed by the equation (32).

The control variable z in the power recirculation mode when the control variable z is the inverse $i_I$ of the IVT speed ratio i is expressed by the equation (33). The control variable z is the direct mode is expressed by the equation (34). The final control variable tz is expressed by the equation (35).

Figure 15:
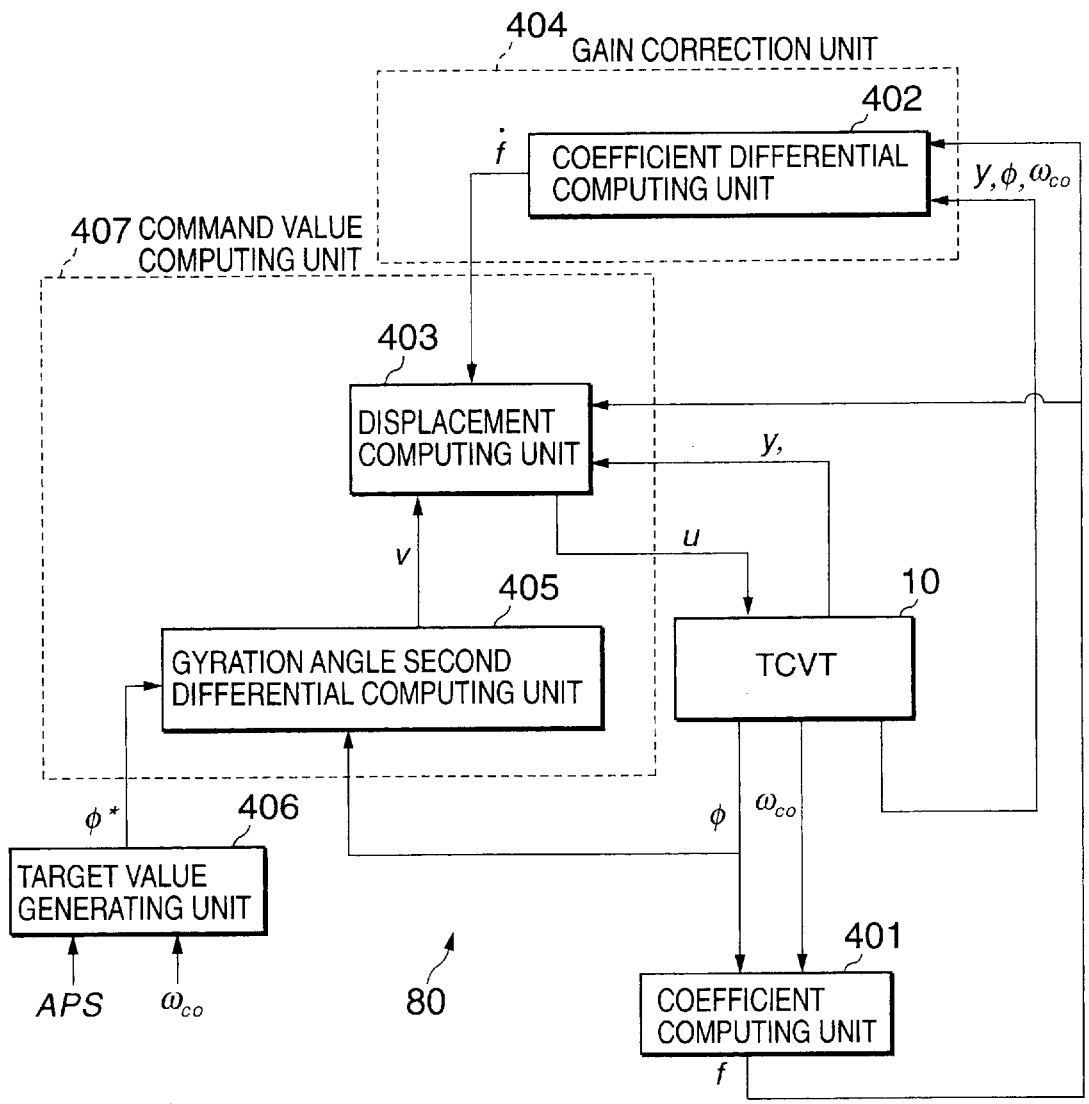
FIG. 15 is a block diagram describing the function of the controller according to a fifth embodiment of this invention.

Next, a fifth embodiment of this invention will be described referring to FIG. 15.

This embodiment corresponds to the case where the control variable z of the fourth embodiment is the gyration angle φ of the power roller. Therefore, the construction of the hardware is identical to that of the fourth embodiment.

The dynamic characteristics of the gyration angle φ relative to the step motor displacement u are expressed by the equation (1) and equation (2).

The controller 80 is provided with a coefficient computing unit 401, a gain correction unit 404 comprising a coefficient differential computing unit 402, a command value computing unit 407 comprising a displacement computing unit 403 and a gyration angle second differential computing unit 405, and a target value generating unit 406.

Of these, the coefficient computing unit 401, coefficient differential computing unit 402 and target value generating unit 406 are identical to the coefficient computing unit 101, coefficient differential computing unit 105 and target value generating unit 109 of the first embodiment.

The gyration angle second differential computing unit 405 calculates a gyration angle second differential φ̈ by the equation (47) of the fourth embodiment.

The relation between the gyration angle second differential φ̈ and the control variable second differential target value v, is specified by the following equation (59).

$$\ddot{\phi}=v \tag{59}$$

The displacement computing unit 403 performs the following calculation.

The following equation (60) is obtained from the equation (47) and equation (59).

$$v=\dot{f}\cdot y+f\cdot g\cdot(u-a_1\cdot\phi-a_2\cdot y) \tag{60}$$

If the equation (60) is solved for the displacement u of the step motor, the following equation (61) is obtained.

$$u=\frac{v}{f\cdot g}+\left(a_2-\frac{\dot{f}}{f\cdot g}\right)\cdot y+a_1\cdot\phi \tag{61}$$

From equation (61), the displacement computing unit 403 calculates the command value u of the step motor.

Also in the equation (61), the differential value $\dot{f}$ of the coefficient f which was considered to be zero in the aforesaid prior art example, is calculated, and the feedback gain of the offset distance y of the trunnion 23 from the neutral position is corrected. Therefore, the relation between the control variable second differential target value v and the gyration angle second differential φ̈ is made linear as shown in FIG. 13B also in this embodiment.

On the other hand, the target gyration angle second step differential target computing unit 405 calculates the second differential v of the target gyration angle from the target gyration angle φ* and gyration angle φ. The control variable second differential target value v and gyration angle second differential φ̈ are shown by the equation (59) and FIG. 13B, as mentioned above.

Therefore, also in this embodiment, the linear controller K(s) shown in FIG. 13C is applied as in the fourth embodiment above, and a closed loop system in which the gyration angle φ has a linear response relative to the target gyration angle φ* is designed. A proportional differential controller (PD controller) is used for the controller K(s). The processing by the PD controller is expressed by the following equation (62). The equation (62) corresponds to the situation where z of the equation (55) in the fourth embodiment, is replaced by φ.

$$v=-k_D\cdot\dot{\phi}-k_P\cdot\phi+k_P\cdot\phi^* \tag{62}$$

The gyration angular velocity φ̇ is calculated by the equation (1). The following equation (63) is obtained from the equation (62) and equation (58). The equation (63) corresponds to an equation wherein z of the equation (56) in the fourth embodiment is replaced by φ.

$$\ddot{\phi}=-k_D\cdot\dot{\phi}-k_P\cdot\phi+k_P\cdot\phi^* \tag{63}$$

Thus, the dynamic characteristics of the control variable φ relative to the target control variable φ* are the linear characteristics shown in the equation (56). The control constants $k_P$, $k_D$ are designed so that the equation (56) has stable, desired characteristics.

Figure 14:
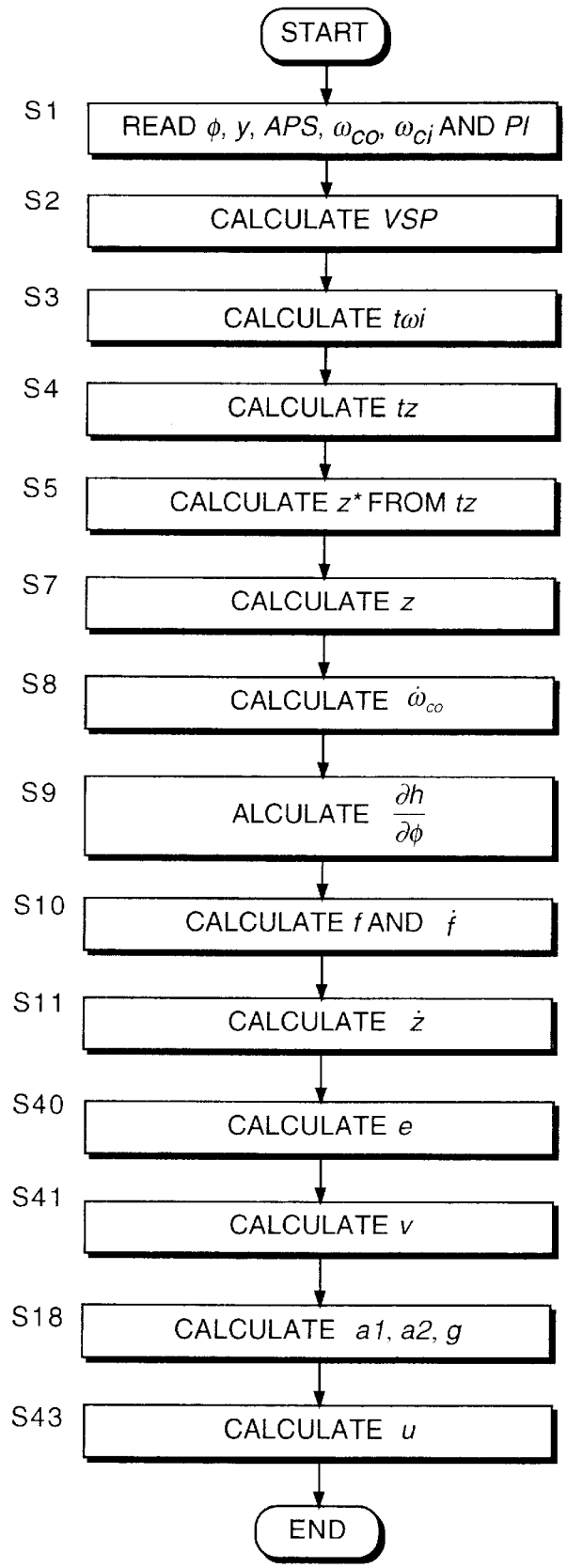
FIG. 14 is a flowchart describing the speed ratio control routine performed by the controller according to the fourth embodiment of this invention.

In order to realize the above control, the controller 80 performs a speed ratio control routine similar to the routine of FIG. 14 in the fourth embodiment, wherein the control variables z, ż, z*, tz are respectively substituted by $\phi$, $\dot{\phi}$, $\phi^*$, t$\phi$.

Next, a sixth embodiment of this invention will be described referring to FIGS. 16, 17, 18A and 18B.

Figure 16:
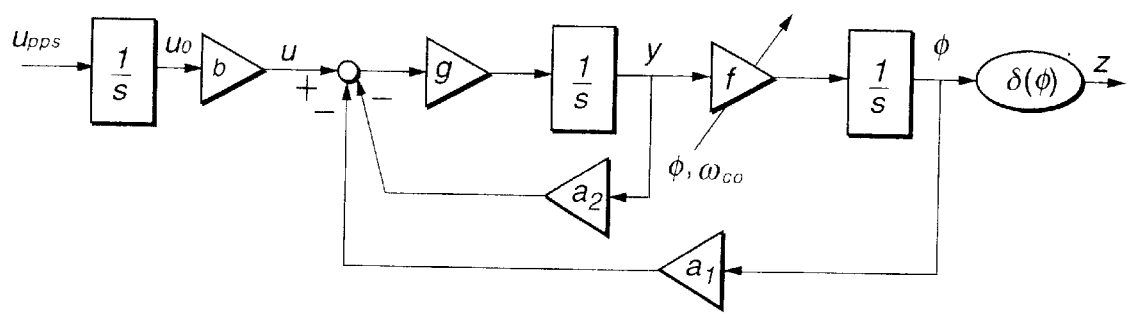
FIG. 16 is a diagram which graphically represents the speed ratio control of the controller according to a sixth embodiment of this invention.

In this embodiment, the dynamic characteristics of the step motor are used for the speed ratio control of the TCVT 10. Referring to FIG. 16, the step motor has a function to integrate a step motor step rate $u_{pps}$ to convert it into a step number $u_0$, and as a result, a step motor displacement u is generated which is proportional to the step number $u_0$.

Here, the relation between the step motor step rate $u_{pps}$ and step motor step number $u_0$ can be expressed by the following equation (64).

$$\dot{u}_0 = u_{pps} \tag{64}$$

The relation between the step motor step number $u_0$ and step motor displacement u can be expressed by the following equation (65).

$$u = b \cdot u_0 \tag{65}$$

where, b=constant depending on and determined by the cam lead of the step motor.

The dynamic characteristics of the variation of the gyration angle $\phi$ of the power roller relative to the displacement u of the step motor, are expressed by the equation (1) and equation (2). The dynamic characteristics of the TCVT 10 are expressed by the following equations (66)–(68) by a combination of the equations (64), (65), and the equations (1), (2).

$$\dot{\phi} = f \cdot y \tag{66}$$

$$\dot{y} = g \cdot (b \cdot u_0 - a_1 \cdot \phi - a_2 \cdot y) \tag{67}$$

$$\dot{u}_0 = u_{pps} \tag{68}$$

As the parameters $a_1$, $a_2$, g of the equation (67) vary according to the line pressure Pl, they are calculated using a map obtained beforehand by a system identification test etc., and are stored in the memory of the controller 80 as constants.

Figure 17:
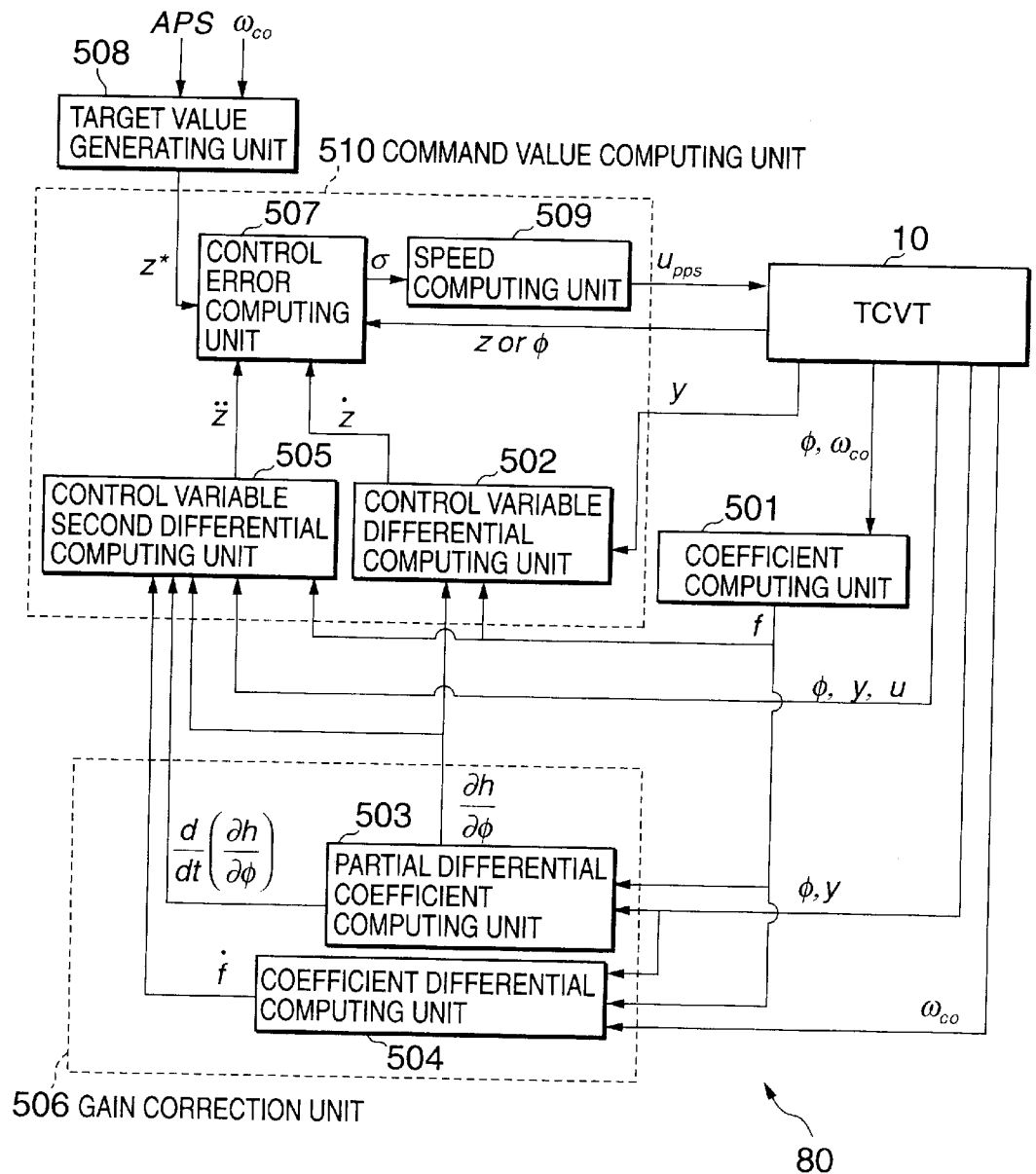
FIG. 17 is a block diagram describing the function of the controller according to the sixth embodiment of this invention.

Next, referring to FIG. 17, the controller 80 is provided with a coefficient computing unit 501, a gain correction unit 506, a command value computing unit 510 and a target value generating unit 508. The gain correction unit 506 comprises a partial differential derivative computing unit 503 and a coefficient differential computing unit 504. The command value computing unit 510 comprises a control variable differential computing unit 502, a control variable second differential computing unit 505, a control error computing unit 507 and a speed computing unit 509.

Of these, the coefficient computing unit 501, control variable differential computing unit 502, partial differential derivative computing unit 503, coefficient differential computing unit 504 and target value generating unit 508 are respectively identical to the coefficient computing unit 101, control variable differential computing unit 102, partial differential derivative computing unit 104, coefficient differential computing unit 105 and target value generating unit 109 of the first embodiment.

The control variable second differential computing unit 505 calculates the control variable second differential $\ddot{z}$ by the following equation (69), using the gyration angle $\phi$ of the power roller, offset distance y of the trunnion from the neutral position, step motor step number $u_0$, rotation speed $\omega_{co}$ of the output disks, and the partial differential derivative $$\frac{\partial h}{\partial \phi}$$

and its time differential $$\frac{d}{dt}\left(\frac{\partial h}{\partial \phi}\right)$$

calculated by the partial differential derivative computing unit 503. The control variable z in this embodiment is the speed ratio G of the TCVT.

$$\ddot{z} = -\frac{\partial h}{\partial \phi} \cdot f \cdot g \left\{ a_2 - \frac{\frac{d}{dt}\left(\frac{\partial h}{\partial \phi}\right)}{\frac{\partial h}{\partial \phi} \cdot g} - \frac{\dot{f}}{f \cdot g} \right\} \cdot y + \frac{\partial h}{\partial \phi} \cdot f \cdot g \cdot (b \cdot u_0 - a_1 \cdot \phi) \tag{69}$$

Equation (69) is an equation obtained by substituting the equations (66)–(68) into the equation (25).

The step motor step number $u_0$ is estimated by an observer, estimated by integrating the command value of the step motor step rate $u_{pps}$, or detected directly using a sensor.

The equation (69) calculates the control variable second differential $\ddot{z}$ by first calculating the differential $\dot{f}$ of the coefficient f and the time differential $$\frac{d}{dt}\left(\frac{\partial h}{\partial \phi}\right)$$

of the partial differential derivative $$\frac{\partial h}{\partial \phi},$$

both of which were assumed to be zero in the prior art example, in the gain correction unit 506.

The control error computing unit 507 calculates a control error σ by the following equation (70), based on the control variable z, control variable differential ż, control variable second differential $\ddot{z}$ and target control variable z*. The equation (70) represents a second order oscillation system between the target control variable z* and the control variable z.

$$\sigma = \ddot{z} + 2 \cdot \zeta \cdot \omega_n \cdot \dot{z} + \omega_n^2 \cdot (z - z^*) \tag{70}$$

where,
 $\omega_n$=natural frequency, and
 ζ=damping coefficient of the second order oscillation system.

The control variable z is calculated using the equation (6) from the gyration angle $\phi$. The gyration angle $\phi$ is measured using the gyration angle sensor 85 of the first embodiment. Alternatively, it is also possible to compute it directly by the equation (5) from the output disk rotation speed $\omega_{co}$ and input disk rotation speed $\omega_{ci}$.

In equation (70), if the control error σ is assumed to be zero, the relation between the control variable z, control variable differential ż and target control variable z*, is expressed by the following equation (71).

$$\ddot{z} = -2\cdot\zeta\cdot\omega_n\cdot\dot{z} - \omega_n^2\cdot z + \omega_n^2\cdot z^* \tag{71}$$

As seen from the equation (71), when the control error σ is zero, the control variable z shows a second order delay response depending on the natural frequency $\omega_n$ and damping coefficient ζ relative to the target control variable z*.

The speed computing unit 509 calculates the command value $u_{pps}$ from the control error σ by the following equation (72).

$$u_{pps} = -k \cdot \frac{\sigma}{|\sigma|} \tag{72}$$

where, k=switching gain.

The switching gain k is set equal to a sufficiently large value, e.g., the maximum drive speed of the step motor. Due to this setting, the control error σ converges to zero in a limited time. The control variable z when the control error σ is maintained at zero, has the linear characteristics shown in the equation (71) relative to the target control variable z*.

Figure 18A:
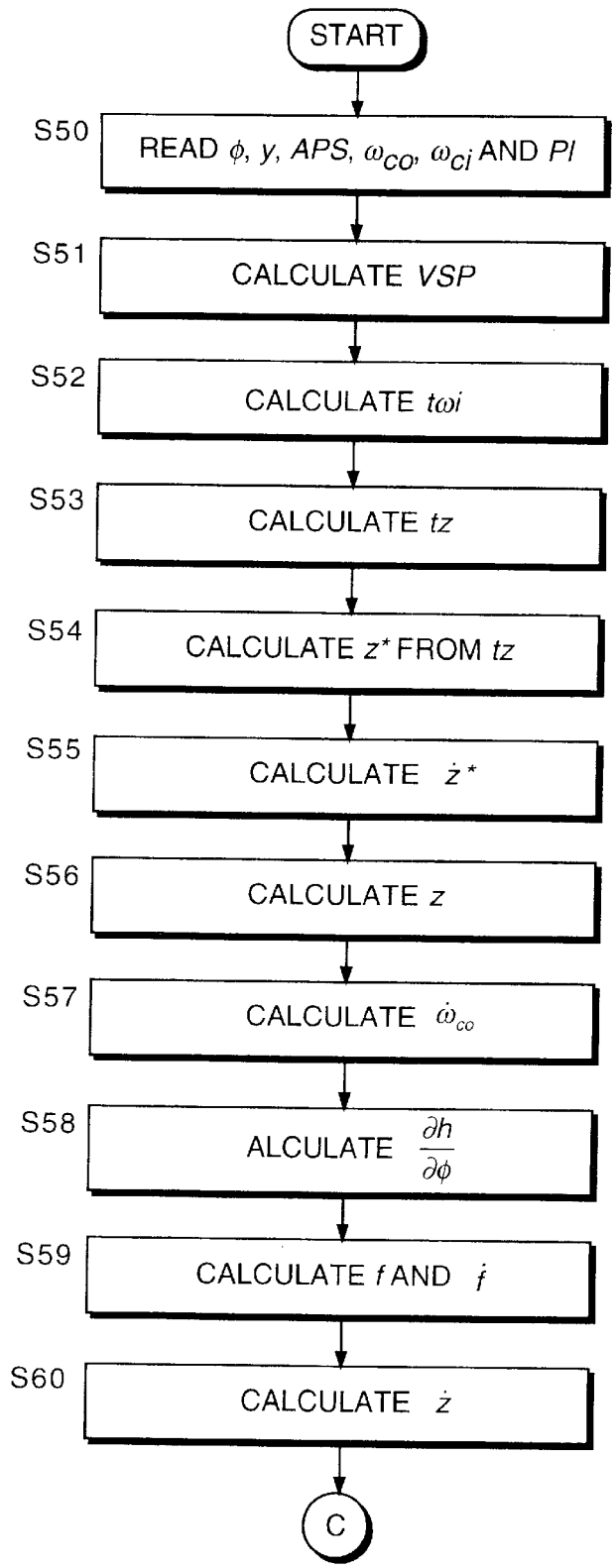
FIGS. 18A and 18B are flowcharts describing the speed ratio control routine performed by the controller according to the sixth embodiment of this invention.
Figure 18B:
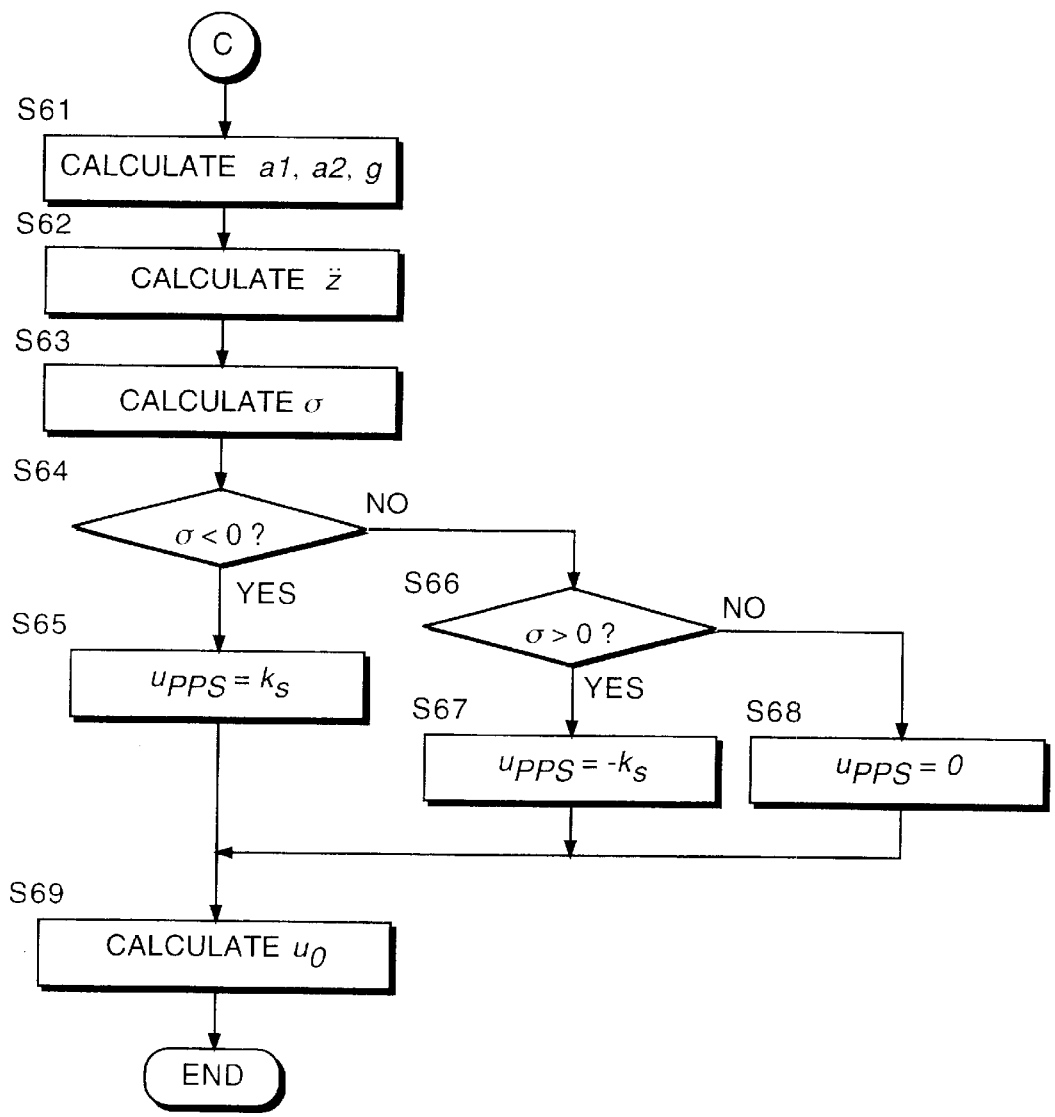

The controller 80 implements the above control by performing the speed ratio control routine shown in FIGS. 18A to 18B. This routine is performed at an interval of twenty milliseconds.

Referring to FIG. 18A, the controller 80, in a step S50, first reads the gyration angle φ of the power roller, the offset distance y of the trunnion from the neutral position, the accelerator pedal depression amount APS, the output disk rotation speed $\omega_{co}$, input disk rotation speed $\omega_{ci}$ and line pressure PI from the signal input from each sensor. The relation between the output disk rotation speed $\omega_{co}$, power roller rotation speed $\omega_{pr}$ and input disk rotation speed $\omega_{ci}$ is expressed by the equations (27), (28).

In a following step S51, the controller 80 calculates the vehicle speed VSP by the equation (17).

In a following step S52, the final input rotation speed tω$_i$ is determined by looking up the map of FIG. 6 from the accelerator pedal depression amount APS and vehicle speed VSP.

In a following step S53, the final control variable tz is calculated by the equation (18), from the final input rotation speed tω$_i$ and the rotation speed $\omega_{co}$ of the output disks 18B, 20B.

In a following step S54, the target control variable z* is obtained by processing the final control variable tz by the lowpass filter of the equation (19).

In a following step S55, the differential ż* of the target control variable z* is calculated by the same process as in the step S6 of the first embodiment.

In a following step S56, the control variable z is calculated from the input disk rotation speed $\omega_{ci}$ and output disk rotation speed $\omega_{co}$. As mentioned above, the control variable z is calculated by the equation (5) from the speed ratio G of the TCVT 10.

In a following step S57, the output disk rotation acceleration $\dot{\omega}_{c0}$ is calculated. This calculation is performed by the equation (29) as the difference between the immediately preceding value $\omega_{co-1}$ of the output disk rotation speed $\omega_{co}$ read on the immediately preceding occasion the routine was performed, and the output disk rotation speed $\omega_{co}$ read on the present occasion the routine is performed. This calculation may be performed using a pseudo-differentiator or an observer.

In a following step S58, the partial differential derivative $$\frac{\partial h}{\partial \phi}$$

is calculated by the equation (7) from the gyration angle φ of the power roller. The partial differential derivative $$\frac{\partial^2 h}{\partial \phi^2}$$

is calculated by the equation (10). Also, $$\frac{\partial f}{\partial \omega_{co}}$$

is calculated by the equation (14). Also, $$\frac{\partial f}{\partial \phi}$$

is calculated by the equation (13) from the gyration angle φ of the power roller, and the output disk rotation speed $\omega_{co}$. These calculations may be performed by referring to maps prestored in the controller 80.

In a following step S59, the coefficient f is calculated by the equation (4) from the output disk rotation speed $\omega_{co}$ and gyration angle φ of the power roller. The time differential f˙ of the coefficient f is calculated by the equation (12) from $$\frac{\partial f}{\partial \omega_{co}}, \frac{\partial f}{\partial \phi},$$

the output disk rotation acceleration $\dot{\omega}_{co}$, the coefficient f and the distance y of the trunnion from he neutral position.

In a following step S60, the control variable differential ż is calculated using the equation (16) from $$\frac{\partial f}{\partial \phi},$$

the coefficient f and offset distance y of the trunnion.

Next, referring to FIG. 18B, in a step S61 following the step S60, the controller 80 calculates the parameters $a_1$, $a_2$, g from the line pressure PI by looking up maps shown in FIGS. 8A–8C.

In the following step S62, using the equation (69), the control variable second differential z̈ is calculated from the gyration angle φ of the power roller, offset distance y of the trunnion, step motor step number $u_0$, output disk rotation speed $\omega_{co}$ and time differential $$\frac{d}{dt}\left(\frac{\partial h}{\partial \phi}\right)$$

of the partial differential derivative $$\frac{\partial h}{\partial \phi}.$$

In a following step S63, the control error σ is calculated using the equation (70) from the control variable second differential $\ddot{z}$, control variable differential $\dot{z}$, control variable z and target control variable z*.

The process from following steps S64 to S68 is related to the calculation of the command value $u_{pps}$ by the equation (72).

First, in a step S64, the controller 80 determines whether or not the control error σ is a negative value. When the control error σ is a negative value, the controller 80 performs the processing of a step S65. When the control error σ is not a negative value, the controller 80 determines whether or not the control error σ is a positive value in a step S66. When the control error σ is a positive value, the controller 80 performs the processing of a step S67, and when the control error σ is not a positive value, i.e., in the case of zero, the processing of a step S68 is performed.

In the step S65, the step motor speed command value $u_{pps}$ is set equal to a constant $k_s$. The constant $k_s$ is a value corresponding to the maximum displacement of the step motor 52. In the step S67, the step motor speed command value $u_{pps}$ is set equal to a constant $-k_s$. In the step S68, the step motor speed command value $u_{pps}$ is set to zero.

In a final step S69, the controller 80 integrates the step motor speed command value $u_{pps}$ by the following equation (73) to compute the step motor step number $u_0$.

$$u_0 = u_{0(-1)} + T \cdot u_{pps} \tag{73}$$

where, $u_{0(-1)}$=step motor step number $u_0$ calculated on the immediately preceding occasion the routine was executed, and T=execution interval of routine=twenty milliseconds.

Due to the execution of the above control routine, the dynamic characteristics of the control variable z relative to the target control variable z* are linear. Therefore, regardless of conditions such as the present speed ratio or the variation amount between the present speed ratio and the target speed ratio, an effectively constant speed change response is obtained regarding the speed ratio variation to any target speed ratio.

This embodiment can also be applied to speed ratio control of the infinitely variable transmission (IVT) as was described in the second embodiment.

In this case, the control variable z can be made the IVT speed ratio i, or the inverse $i_I$ of the IVT speed ratio i. In any case, the target value generating unit 508 calculates the target control variable z* from the accelerator pedal depression amount APS detected by the accelerator pedal depression amount sensor 81, and the IVT output shaft rotation speed $\omega_{io}$.

The control variable z in the power recirculation mode when the control variable z is the IVT speed ratio i, is expressed by the equation (31) as in the second embodiment.

The control variable z in the direct mode is expressed by the equation (6) as in the second embodiment.

The control variable z in the power recirculation mode when the control variable z is the inverse $i_I$ of an IVT speed ratio i is expressed by the equation (33) as in the second embodiment. The control variable z in the direct mode is expressed by the equation (34) as in the second embodiment.

Next, a seventh embodiment of this invention will be described referring to FIG. 19. In this embodiment, the control variable z in the sixth embodiment is set to the gyration angle φ of the power roller as in the third embodiment. The construction of the hardware is identical to that of the sixth embodiment.

The dynamic characteristics of the TCVT 10 are expressed by the equations (66)–(68), as in the sixth embodiment above.

Figure 19:
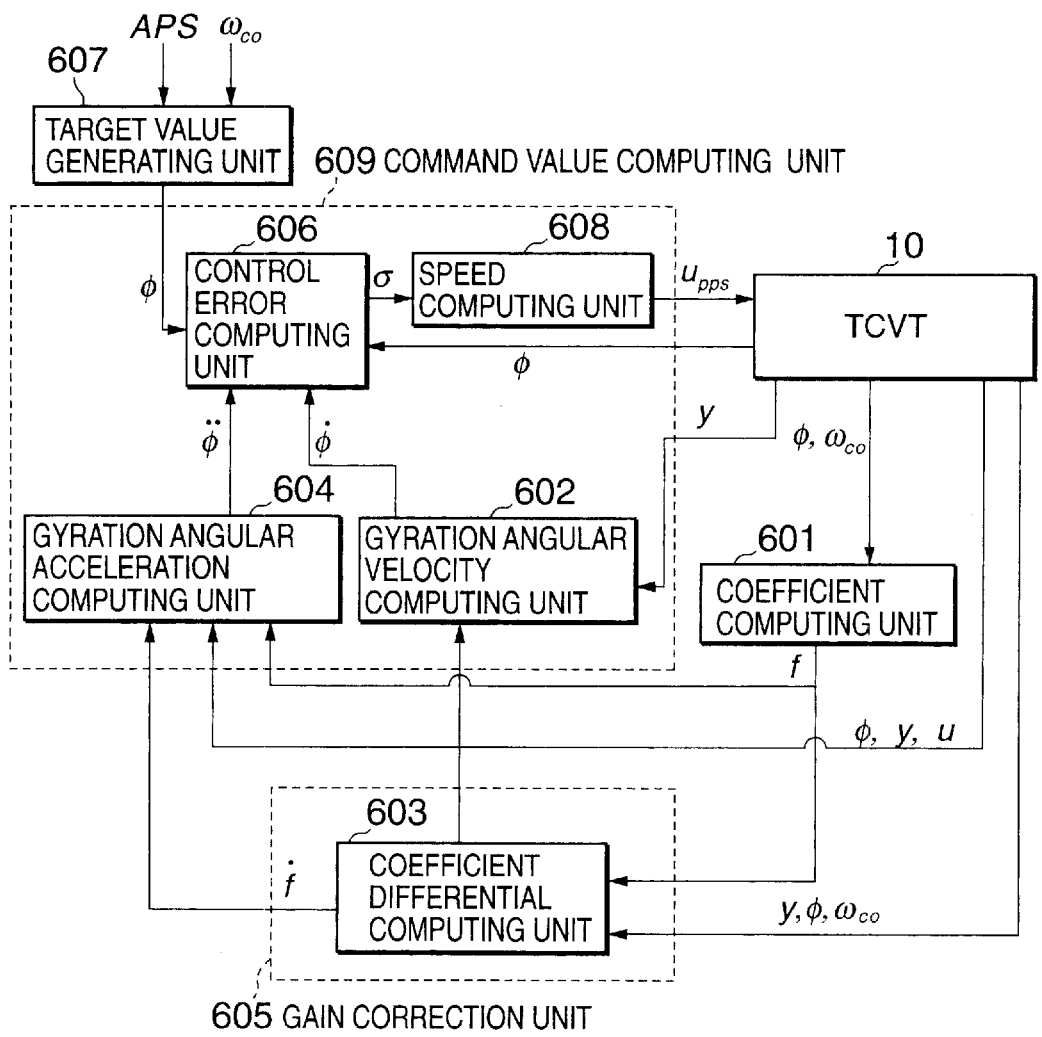
FIG. 19 is a block diagram describing the function of the controller according to a seventh embodiment of this invention.

Referring to FIG. 19, the controller 80 comprises a coefficient computing unit 601, a gain correction unit 605, a command value computing unit 609 and a target value generating unit 607. The gain correction unit 605 comprises a coefficient differential computing unit 603.

The command value computing unit 609 comprises a gyration angular velocity computing unit 602, a gyration angular acceleration computing unit 604, a control error computing unit 606 and a speed computing unit 608.

The coefficient computing unit 601 and the coefficient differential computing unit 603 are identical to the coefficient computing unit 101 and coefficient differential computing unit 105 of the first embodiment.

The gyration angular velocity computing unit 602 and the target value generating unit 607 are identical to the target value generating unit 208 and gyration angular velocity computing unit 202 of the third embodiment.

The gyration angular acceleration computing unit 604 calculates the gyration angular acceleration $\ddot{\phi}$ from the gyration angle φ of the power roller, offset distance y of the trunnion, step motor step number $u_0$ and coefficient f. If the equation (67) is substituted in the equation (46) which represents the gyration angular acceleration $\ddot{\phi}$, the following equation (74) is obtained.

$$\ddot{\phi} = f \cdot g \cdot \left(a_2 + \frac{\dot{f}}{f \cdot g}\right) \cdot y + f \cdot g \cdot (c \cdot u_0 - a_1 \cdot \dot{\phi}) \tag{74}$$

where, c=constant.

The step motor step number $u_0$ in the equation (74) is estimated by an observer, or is estimated by integrating the step motor step rate command value $u_{pps}$. In the equation (74), the coefficient of the offset distance y of the trunnion is corrected using the differential value $\dot{f}$ of the coefficient f, which was assumed to be zero in the prior art example. This correction is performed by the gain correction unit 605.

The control error computing unit 606 calculates the control error σ from the gyration angle φ, gyration angular velocity $\dot{\phi}$, gyration angular acceleration $\ddot{\phi}$ and target gyration angle φ*.

The relation between the control error σ, gyration angle φ, gyration angular velocity $\dot{\phi}$, gyration angular acceleration $\ddot{\phi}$ and target gyration angle φ* is specified by the following equation (75), as in the case of equation (70) of the sixth embodiment.

$$\sigma = \ddot{\phi} + 2 \cdot \zeta \cdot \omega_n \cdot \dot{\phi} + \omega_n^2 \cdot (\phi - \phi^*) \tag{75}$$

where, $\omega_n$=natural frequency, and

ζ=damping coefficient.

The gyration angle φ of the equation (75) is detected by the gyration angle sensor. However, it is also possible to compute the TCVT speed ratio G by the equation (5) from the output disk rotation speed $\omega_{co}$ and input disk rotation speed $\omega_{ci}$, and calculate the gyration angle φ using the map shown in FIG. 5.

When the control error σ is zero, the relation between the gyration angle φ, gyration angular velocity $\dot{\phi}$, gyration angular acceleration $\ddot{\phi}$ and target gyration angle φ* is expressed by the following equation (76).

$$\ddot{\phi} = -2 \cdot \zeta \cdot \omega_n \cdot \dot{\phi} - \omega_n^2 \cdot \phi + \omega_n^2 \cdot \phi^* \tag{76}$$

As shown in equation (76), when the control error σ is zero, the gyration angle φ shows a second order delay response depending on the natural frequency $\omega_n$ and damping coefficient ζ relative to the target gyration angle φ*.

The speed computing unit 608 computes the command value $u_{pps}$ from the control error σ.

The relation between the control error C and command value $u_{pps}$ is specified by the equation (72), which is identical to the sixth embodiment. When the control error σ is zero, the dynamic characteristics of the gyration angle φ relative to the target gyration angle φ* are linear characteristics expressed by the equation (76).

Figure 20A:
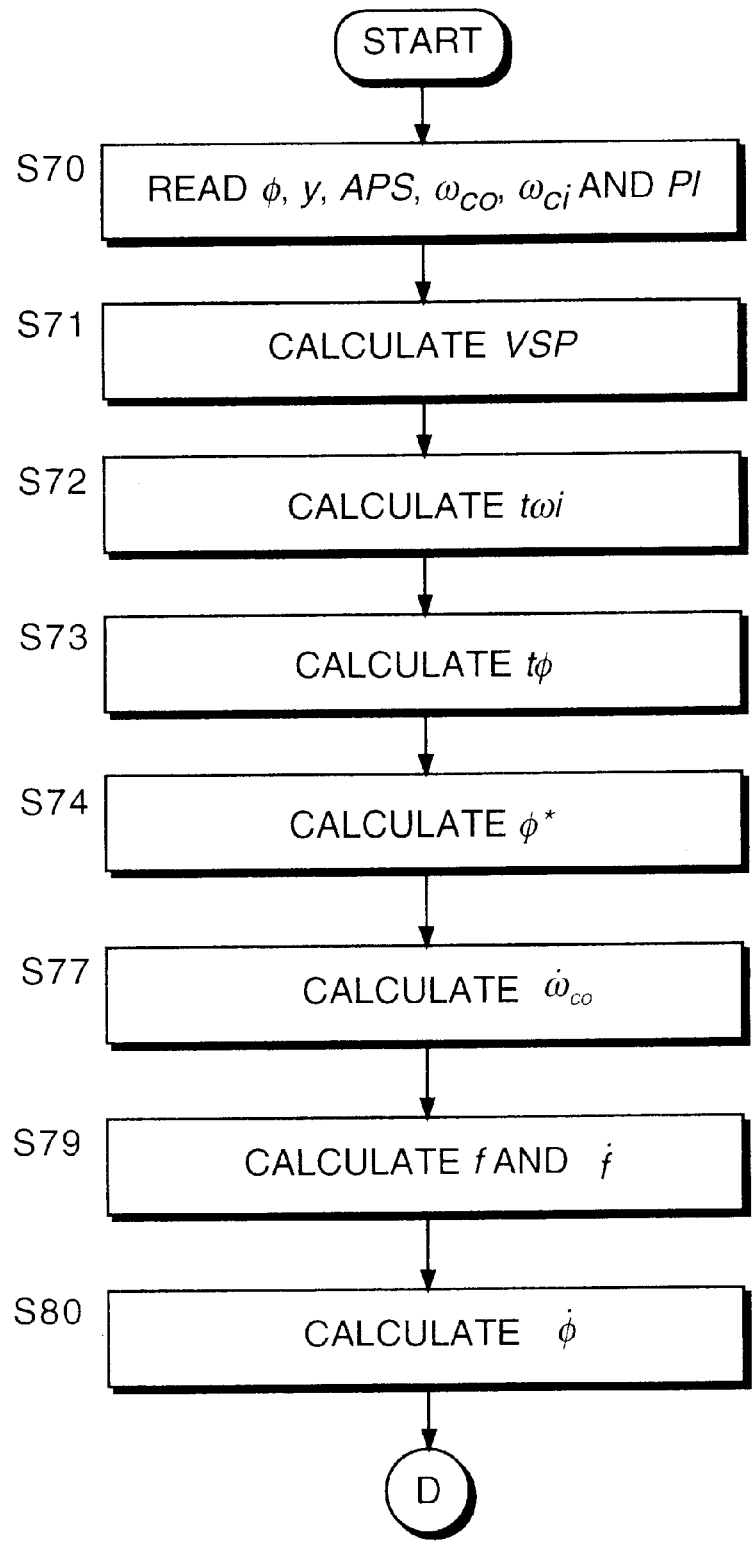
FIGS. 20A and 20B are flowcharts describing the speed change control routine performed by the controller according to the seventh embodiment of this invention.
Figure 20B:
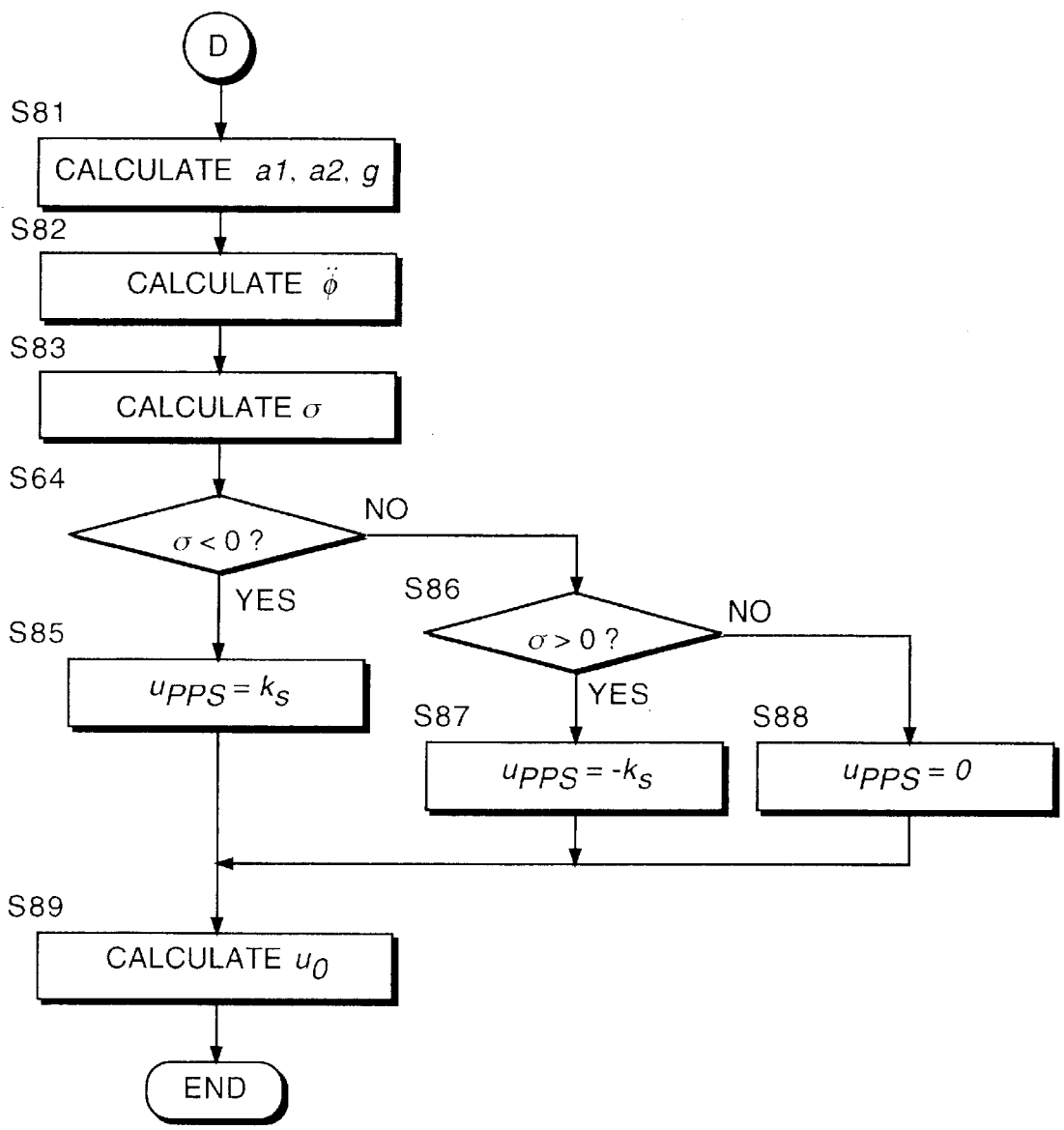

The controller 80 realizes the above control by performing the speed ratio control routine shown in FIGS. 20A and 20B. This routine is performed at an interval of twenty milliseconds.

Steps S70–S72 are identical to the steps S1–S3 of the third embodiment, and steps S73 and S74 are identical to the steps S104 and S105 of the third embodiment.

In a following step S77, the output disk rotation acceleration $\dot{\omega}_{co}$ is calculated by an identical process to the step S8 of the first embodiment.

In a following step S79, the coefficient f and its time differential $\dot{f}$ are calculated in an identical process to the step S110 of the third embodiment.

In a following step S80, the gyration angle variation rate $\dot{\phi}$ is calculated in an identical process to the step S111 of the third embodiment.

In a following step S81, the parameters $a_1$, $a_2$, g are calculated from the line pressure PI by looking up the maps shown in FIGS. 8A–8C as in the step S61 of the sixth embodiment.

In a following step S82, the gyration angular acceleration $\ddot{\phi}$ is calculated by using the equation (74).

In a following step S83, the control error σ is calculated by using the equation (75).

The following steps S84–S89 are identical to those of the steps S64–S69 of the sixth embodiment.

Due to the above control procedure, the dynamic characteristics of the gyration angle φ are made linear relative to the target control variable φ*.

Therefore, regarding the variation of the gyration angle φ to the target gyration angle φ*, a substantially constant response is obtained relative to the displacement of the step motor.

The contents of Tokugan 2001-224122, with a filing date of Jul. 25, 2001 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

The embodiments of this invention in which an exclusive property or privilege is claimed are defined as follows:

What is claimed is:

1. A control device of a toroidal continuously variable transmission for a vehicle, the vehicle comprising an accelerator pedal, and the toroidal continuously variable transmission comprising an input disk, an output disk, a power roller which transmits torque between the input disk and the output disk, a trunnion which supports the power roller free to rotate, the trunnion comprising a trunnion shaft, the power roller varying a gyration angle (φ) according to a displacement (y) of the trunnion in the direction of the trunnion shaft to vary a speed ratio of the input disk and output disk, and an oil pressure actuator which drives the trunnion in the direction of the trunnion shaft, the device comprising:

a control valve which supplies oil pressure to the oil pressure actuator;

a mechanical feedback mechanism connecting the trunnion and the control valve to feed back the displacement of the trunnion to the control valve;

a valve actuator which controls the control valve according to a command value (u);

a sensor which detects a rotation speed ($\omega_{co}$) of the output disk;

a sensor which detects a depression amount (APS) of the accelerator pedal;

a sensor which detects the gyration angle (φ) of the power roller;

a sensor which detects the displacement (y) of the trunnion in the direction of the trunnion shaft; and a programmable controller programmed to:

calculate a target control variable (z*) which is a target value of a control variable (z) being an object of control, based on the accelerator pedal depression amount (APS) and the output disk rotation speed ($\omega_{co}$);

calculate a time-variant coefficient (f) representing the relation between the displacement (y) of the trunnion in the direction of the trunnion shaft and a variation rate ($\dot{\phi}$) of the gyration angle (φ) of the power roller;

calculate a first time differential ($\dot{f}$) which is a time differential of the time-variant coefficient (f); and determine the command value (u) by applying a control gain based on the first time differential ($\dot{f}$).

2. The control device as defined in claim 1, wherein the controller is further programmed to calculate a first partial differential derivative $$\left(\frac{\partial h}{\partial \phi}\right)$$

with respect to the gyration angle (φ) of a function h(φ), the function h(φ) showing the relation between the gyration angle (φ) and the control variable (z), and a second time differential $$\left(\frac{d}{dt}\left(\frac{\partial h}{\partial \phi}\right)\right)$$

which is a time differential of the first partial differential derivative $$\left(\frac{\partial h}{\partial \phi}\right),$$

and determine the control gain based on the first time differential ($\dot{f}$) and the second time differential $$\left(\frac{d}{dt}\left(\frac{\partial h}{\partial \phi}\right)\right).$$

3. The control device as defined in claim 2, wherein the controller is further programmed to calculate a third time differential ($\dot{z}$) which is a time differential of the control variable (z), from the first partial differential derivative $$\left(\frac{\partial h}{\partial \phi}\right),$$

the coefficient (f) and the displacement (y) of the trunnion in the direction of the trunnion shaft, calculate a control error (σ) of a real control variable (z) with respect to a predetermined linear characteristic of the control variable (z) from the real control variable (z), the third time differential (ż) and the target control variable (z*), calculate a control error correction amount ($u_{sw}$) causing the control error (σ) to decrease, calculate a fourth time differential (z̈*) which is a time differential of the target control variable (z*), calculate an equivalent input value ($u_{eq}$) corresponding to an input value to the valve actuator causing the control error (σ) to be constant, from the fourth time differential (z̈*), the third time differential (ż), the displacement (y) of the trunnion in the direction of the trunnion shaft, the gyration angle (φ), the coefficient (f), the first time differential (ḟ) and the first partial differential derivative $$\left(\frac{\partial h}{\partial \phi}\right),$$

and determine the command value based on the sum of the control error correction amount ($u_{sw}$) and the equivalent input value ($u_{eq}$).

4. The control device as defined in claim 1, wherein the control variable (z) is the gyration angle (φ) of the power roller, the target control variable (z*) is a target gyration angle (φ*) which is a target value of the gyration angle (φ), and the controller is further programmed to calculate a gyration angle variation rate (φ̇), being a time differential of the gyration angle (φ), from the coefficient (f) and the displacement (y) of the trunnion in the direction of the trunnion shaft, calculate a control error (σ) of a real gyration angle (φ) with respect to a predetermined linear characteristic of the gyration angle (φ), from the gyration angle (φ), the gyration angle variation rate (φ̇) and the target gyration angle (φ*), calculate a control error correction amount ($u_{sw}$) causing the control error (σ) to decrease, calculate the target gyration angle variation rate (φ̇*) which is a time differential of the target gyration angle (φ*), calculate an equivalent input value ($u_{eq}$) which corresponds to the input value to the valve actuator causing the control error (σ) to be constant, from the target gyration angle variation rate (φ̇*), the gyration angle variation rate (φ̇), displacement (y) of the trunnion in the direction of the trunnion shaft, the gyration angle (φ) and the coefficient (f), and determine the command value (u) based on the sum of the control error correction amount ($u_{sw}$) and the equivalent input value ($u_{eq}$).

5. The control device as defined in claim 2, wherein the controller is further programmed to calculate a control variable second differential target value (v) when a dynamic characteristic of the variation of the control variable (z) with respect to the target control variable (z*) coincides with a predetermined linear characteristic, from the target control variable (z*) and the control variable (z), and determine the command value (u) causing the dynamic characteristic of the variation of the control variable (z) with respect to the target control variable (z*) to coincide with the predetermined linear characteristic, from the control variable second differential (v), the first partial differential derivative $$\left(\frac{\partial h}{\partial \phi}\right),$$

the second time differential $$\left(\frac{d}{dt}\left(\frac{\partial h}{\partial \phi}\right)\right),$$

do the coefficient (f) the displacement (y) of the trunnion in the direction of the trunnion shaft, and the gyration angle (φ).

6. The control device as defined in claim 2, wherein the controller is further programmed to calculate a control variable time differential (ż) which is a time differential of the control variable (z), from the coefficient (f), the displacement (y) of the trunnion in the direction of the trunnion shaft, and the first partial differential derivative $$\left(\frac{\partial h}{\partial \phi}\right),$$

calculate a control variable second differential (z̈) from the coefficient (f), the first time differential (ḟ), the gyration angle (φ), the displacement (y) of the trunnion in the direction of the trunnion shaft, the command value (u), the first partial differential derivative $$\left(\frac{\partial h}{\partial \phi}\right)$$

and the second time differential $$\left(\frac{d}{dt}\left(\frac{\partial h}{\partial \phi}\right)\right),$$

calculate a control error (σ) corresponding to a deviation of a dynamic characteristic of the variation of the control variable (z) with respect to the target control variable (z*) from a predetermined linear characteristic, based on the target control variable (z*), the control variable (z), the control variable time differential (ż) and the control variable second time differential (z̈), and determine the command value (u) to cause the control error (σ) to decrease.

7. The control device as defined in claim 1, wherein the control variable (z) is the gyration angle (φ) of the power roller, the target control variable (z*) is a target gyration angle (φ*) which is a target value of the gyration angle (φ), and the controller is further programmed to calculate a control variable second differential target value (v) when a dynamic characteristic of the variation of the control variable (z) with respect to the target control variable (z*) coincides with a predetermined linear characteristic, from the target gyration angle (φ*) and the gyration angle (φ), and determine the command value (u) causing the dynamic characteristic of the variation of the gyration angle (φ) with respect to the target gyration angle (φ*) to coincide with the predetermined linear characteristic, from the control variable second differential (v), the coefficient (f), the first time differential (ḟ), the displacement (y) of the trunnion in the direction of the trunnion shaft, and the gyration angle (φ).

8. The control device as defined in claim 1, wherein the control variable (z) is the gyration angle (φ), the target control variable (z*) is a target gyration angle (φ*) which is a target value of the gyration angle ($\phi$), and the controller is further programmed to calculate a gyration angular velocity ($\dot{\phi}$) from the coefficient (f) and the displacement (y) of the trunnion in the direction of the trunnion shaft, calculate a gyration angular acceleration ($\ddot{\phi}$) from the coefficient (f), the displacement (y) of the trunnion in the direction of the trunnion shaft, the gyration angular velocity ($\dot{\phi}$), the command value (u) and the first time differential ($\dot{f}$), calculate a control error ($\sigma$) corresponding to a deviation of a dynamic characteristic of the variation of the gyration angle ($\phi$) with respect to the target gyration angle ($\phi^*$) from a predetermined linear characteristic, based on the target gyration angle ($\phi^*$), the gyration angle ($\phi$), the gyration angular velocity ($\dot{\phi}$) and the gyration angular acceleration ($\ddot{\phi}$), and determine the command value (u) to cause the control error ($\sigma$) to decrease.

9. A control device of a toroidal continuously variable transmission for a vehicle, the vehicle comprising an accelerator pedal, and the toroidal continuously variable transmission comprising an input disk, an output disk, a power roller which transmits torque between the input disk and the output disk, a trunnion which supports the power roller free to rotate, the trunnion comprising a trunnion shaft, the power roller varying a gyration angle ($\phi$) according to a displacement (y) of the trunnion in the direction of the trunnion shaft to vary a speed ratio of the input disk and output disk, and an oil pressure actuator which drives the trunnion in the direction of the trunnion shaft, the device comprising:

means for supplying oil pressure to the oil pressure actuator;

means for connecting the trunnion and the control valve to feed back the displacement of the trunnion to the control valve;

means for controlling the supplying means according to a command value (u);

means for detecting a rotation speed ($\omega_{co}$) of the output disk;

means for detecting a depression amount (APS) of the accelerator pedal;

means for detecting the gyration angle ($\phi$) of the power roller;

means for detecting the displacement (y) of the trunnion in the direction of the trunnion shaft;

means for calculating a target control variable (z*) which is a target value of a control variable (z) being an object of control, based on the accelerator pedal depression amount (APS) and the output disk rotation speed ($\omega_{co}$);

means for calculating a time-variant coefficient (f) representing the relation between the displacement (y) of the trunnion in the direction of the trunnion shaft and a variation rate ($\dot{\phi}$) of the gyration angle ($\phi$) of the power roller;

means for calculating a first time differential ($\dot{f}$) which is a time differential of the time-variant coefficient (f); and means for determining the command value (u) by applying a control gain based on the first time differential ($\dot{f}$).

10. A control method of a toroidal continuously variable transmission for a vehicle, the vehicle comprising an accelerator pedal, and the toroidal continuously variable transmission comprising an input disk, an output disk, a power roller which transmits torque between the input disk and the output disk, a trunnion which supports the power roller free to rotate, the trunnion comprising a trunnion shaft, the power roller varying a gyration angle ($\phi$) according to a displacement (y) of the trunnion in the direction of the trunnion shaft to vary a speed ratio of the input disk and output disk, an oil pressure actuator which drives the trunnion in the direction of the trunnion shaft, a control valve which supplies oil pressure to the oil pressure actuator, a mechanical feedback mechanism connecting the trunnion and the control valve to feed back the displacement of the trunnion to the control valve, and a valve actuator which controls the control valve according to a command value (u), the method comprising:

detecting a rotation speed ($\omega_{co}$) of the output disk;

detecting a depression amount (APS) of the accelerator pedal;

detecting the gyration angle ($\phi$) of the power roller;

detecting the displacement (y) of the trunnion in the direction of the trunnion shaft;

calculating a target control variable (z*) which is a target value of a control variable (z) being an object of control, based on the accelerator pedal depression amount (APS) and the output disk rotation speed ($\omega_{co}$);

calculating a time-variant coefficient (f) representing the relation between the displacement (y) of the trunnion in the direction of the trunnion shaft and a variation rate ($\dot{\phi}$) of the gyration angle ($\phi$) of the power roller;

calculating a first time differential ($\dot{f}$) which is a time differential of the time-variant coefficient (f); and determining the command value (u) by applying a control gain based on the first time differential ($\dot{f}$).

* * * * *